(12) United States Patent
Sakai

(10) Patent No.: US 10,248,454 B2
(45) Date of Patent: Apr. 2, 2019

(54) INFORMATION PROCESSING SYSTEM AND APPARATUS FOR MIGRATING OPERATING SYSTEM

(71) Applicant: FUJITSU LIMITED, Kawasaki-shi, Kanagawa (JP)

(72) Inventor: Atsushi Sakai, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 208 days.

(21) Appl. No.: 15/155,121

(22) Filed: May 16, 2016

(65) Prior Publication Data
US 2016/0357602 A1 Dec. 8, 2016

(30) Foreign Application Priority Data

Jun. 8, 2015 (JP) .................................. 2015-115521

(51) Int. Cl.
*G06F 9/48* (2006.01)
*G06F 9/4401* (2018.01)
*G06F 9/455* (2018.01)

(52) U.S. Cl.
CPC .......... *G06F 9/4856* (2013.01); *G06F 9/4406* (2013.01); *G06F 9/45558* (2013.01); *G06F 2009/4557* (2013.01)

(58) Field of Classification Search
CPC ....... G06F 9/441; G06F 9/4406; G06F 9/4401
See application file for complete search history.

(56) References Cited

U.S. PATENT DOCUMENTS

| 2004/0010787 | A1 | 1/2004 | Traut et al. | |
|---|---|---|---|---|
| 2008/0098154 | A1 | 4/2008 | Traut et al. | |
| 2009/0150463 | A1* | 6/2009 | Sekiguchi | G06F 9/44505 |
| 2013/0263128 | A1 | 10/2013 | Yamazaki | |
| 2015/0301848 | A1* | 10/2015 | Roehrig | G06F 9/45508 718/1 |
| 2016/0034289 | A1* | 2/2016 | Amano | G06F 11/30 718/1 |

FOREIGN PATENT DOCUMENTS

| JP | 2009-145931 | 7/2009 |
|---|---|---|
| JP | 2012-074090 | 4/2012 |
| JP | 2012-234564 | 11/2012 |
| JP | 2013-205946 | 10/2013 |

* cited by examiner

*Primary Examiner* — Jaweed A Abbaszadeh
*Assistant Examiner* — Alyaa T Mazyad
(74) *Attorney, Agent, or Firm* — Fujitsu Patent Center

(57) ABSTRACT

An information processing system includes a first server, a second server and an information processing apparatus, the information processing apparatus including a processor configured to manage a process of causing OS running on the first server to run on the second server, and the first server including a driver configured acquire an address of the physical memory area allocated for running Booting OS to boot the OS and a controller configured to notify the processor of the address of the physical memory area, wherein the processor causes the Booting OS to run at the address of the physical memory area of the first server or the second server, and causes the OS to run on the second server by transferring the OS to the second server from the first server.

8 Claims, 21 Drawing Sheets

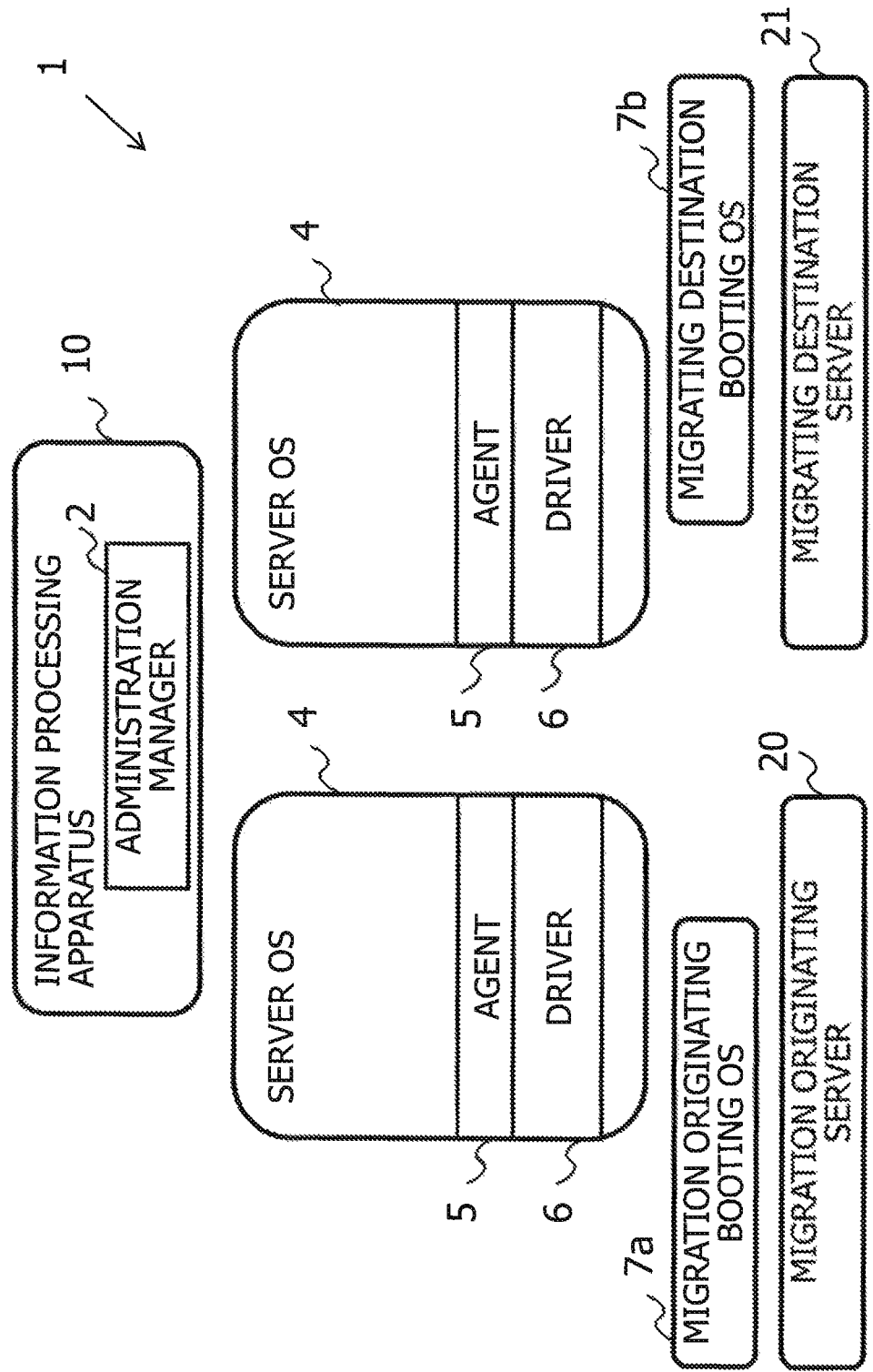

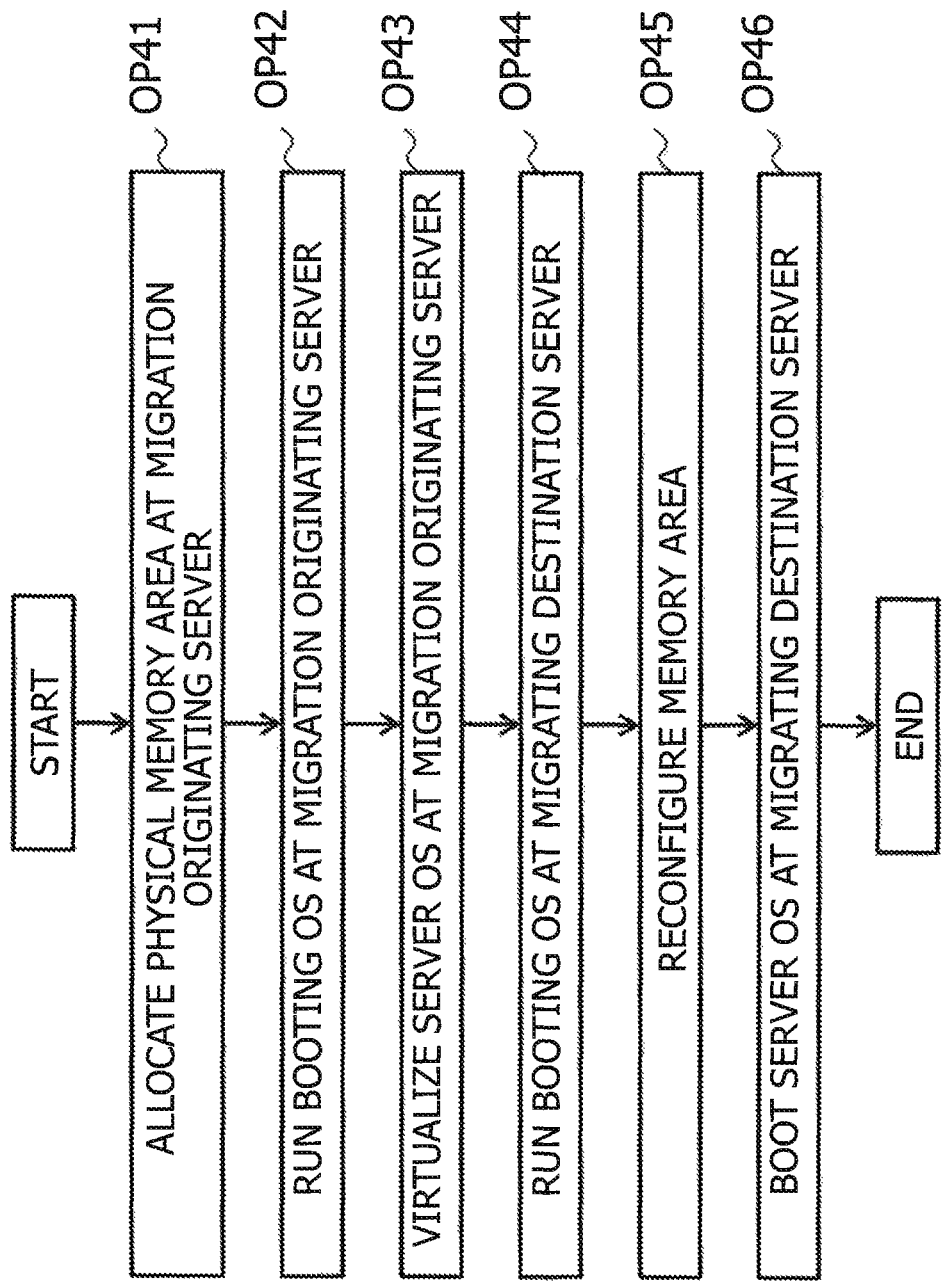

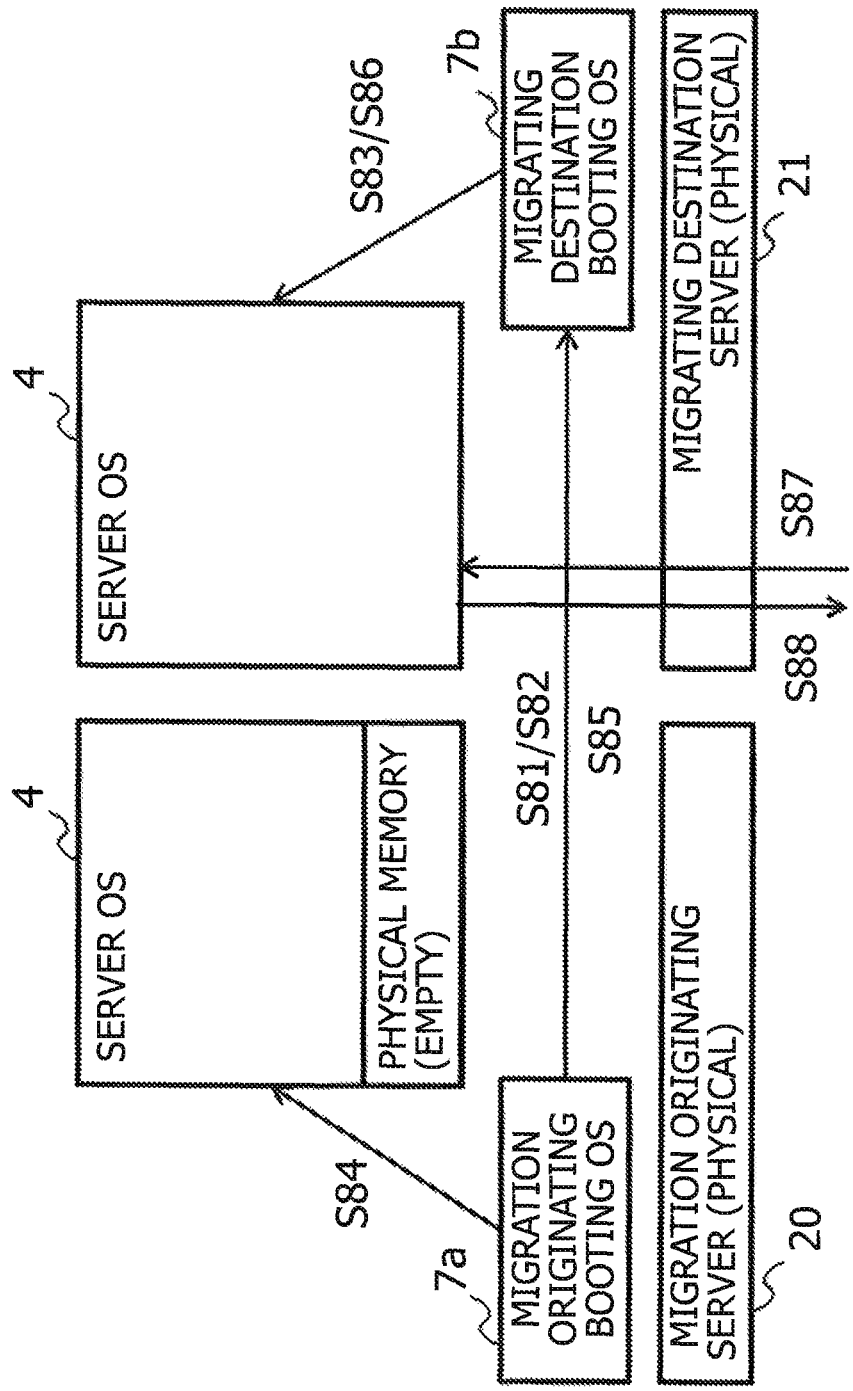

INFORMATION PROCESSING SYSTEM AND APPARATUS FOR MIGRATING OPERATING SYSTEM

CROSS-REFERENCE TO RELATED APPLICATION

This application is based upon and claims the benefit of priority of the prior Japanese Patent Application No. 2015-115521, filed on Jun. 8, 2015, the entire contents of which are incorporated herein by reference.

FIELD

The embodiments discussed herein are related to an information processing system and an apparatus for migrating operating system.

BACKGROUND

OS (Operating System) running on a server operating in progress is made to run on another server (which will hereinafter be also termed "an active migration") without suspending the OS, which facilitates operation management of the server.

The active migration of the server is enabled between virtual servers with hypervisors to control execution of a plurality of different virtualized OSs. This is because the virtual servers cause CPUs to execute instructions via the hypervisors, and a cooperation between the hypervisors of a migration originating server and a migrating destination server enables the migrating destination server to acquire control information of the processor of the migration originating server and to re-run the OS.

On the other hand, such a case exists that a plurality of physical servers is migrated to and integrated into one server as virtual servers for reducing power consumption. With an advent of power-saving CPUs, the servers are operated with the power consumptions proportional to load states. A shift to a new server mounted with the power-saving CPU is expected to increase. The server mounted with the power-saving CPU does not run a plurality of virtual servers on one single server for avoiding futility of the power consumption, and the migration to a physical server from the virtual server is also expected to increase.

[Patent document 1] Japanese Laid-Open Patent Publication No. 2009-145931

[Patent document 2] Japanese Laid-Open Patent Publication No. 2013-205946

[Patent document 3] Japanese Laid-Open Patent Publication No. 2012-74090

[Patent document 4] Japanese Laid-Open Patent Publication No. 2012-234564

SUMMARY

According to an aspect of the embodiments, an information processing system includes a first server, a second server and an information processing apparatus, The information processing apparatus includes a management unit to manage a process of causing OS running on the first server to run on the second server; the first server includes a driver to acquire an address of the physical memory area allocated for running Booting OS to boot the OS, and a communication unit to notify the management unit of the acquired address; and the management unit causes the Booting OS to run at the acquired address of the first server or the second server, and causes the OS to run on the second server by transferring the OS to the second server from the first server.

The object and advantages of the invention will be realized and attained by means of the elements and combinations particularly pointed out in the claims. It is to be understood that both the foregoing general description and the following detailed description are exemplary and explanatory and are not restrictive of the invention.

BRIEF DESCRIPTION OF THE DRAWINGS

FIG. 19 is a diagram illustrating one example of a system architecture of the information processing system according to a third embodiment;

FIG. 20 is a flowchart of one example of a migration process between the physical servers according to the third embodiment; and FIG. 21 is a diagram illustrating an operational example of booting the server OS at the migrating destination server according to the third embodiment.

DESCRIPTION OF EMBODIMENTS

When migrating the server between the virtual server and the physical server or between the physical servers, the migration originating server is suspended and then migrated after conducting processes for restoration at the migrating destination server.

The migration between the servers including the physical servers is different from a migration between the virtual servers in terms of not having a mechanism for allocating the same physical memory area at the migrating destination server as the physical memory area of the migration originating server, and giving an instruction of re-running the OS during the operation of the migration originating server.

It is also considered to migrate with the migration originating server in a halt state in addition to a shutdown state due to a cut-off of a power source. In this case, such a process takes a considerable period of time as to write a content retained by a main memory to a hard disk before setting the server in the halt state in order to migrate a memory state, read the memory content from the hard disk when resumed at the migrating destination server, and reset the memory to the state just before switching OFF the power source.

Embodiments of the present invention will hereinafter be described based on the drawings. Configurations of the following embodiments are exemplifications, and the present invention is not limited to the configurations of the embodiments.

First Embodiment

A first embodiment will discuss an active migration from a virtual server to a physical server. An information processing apparatus dynamically allocates a physical memory area for loading OS for booting in the migration originating virtual server. The information processing apparatus boots OS transferred to the physical server from the virtual server by operating the OS for booting in the migrating destination physical server.

<System Architecture>

Figure 1:
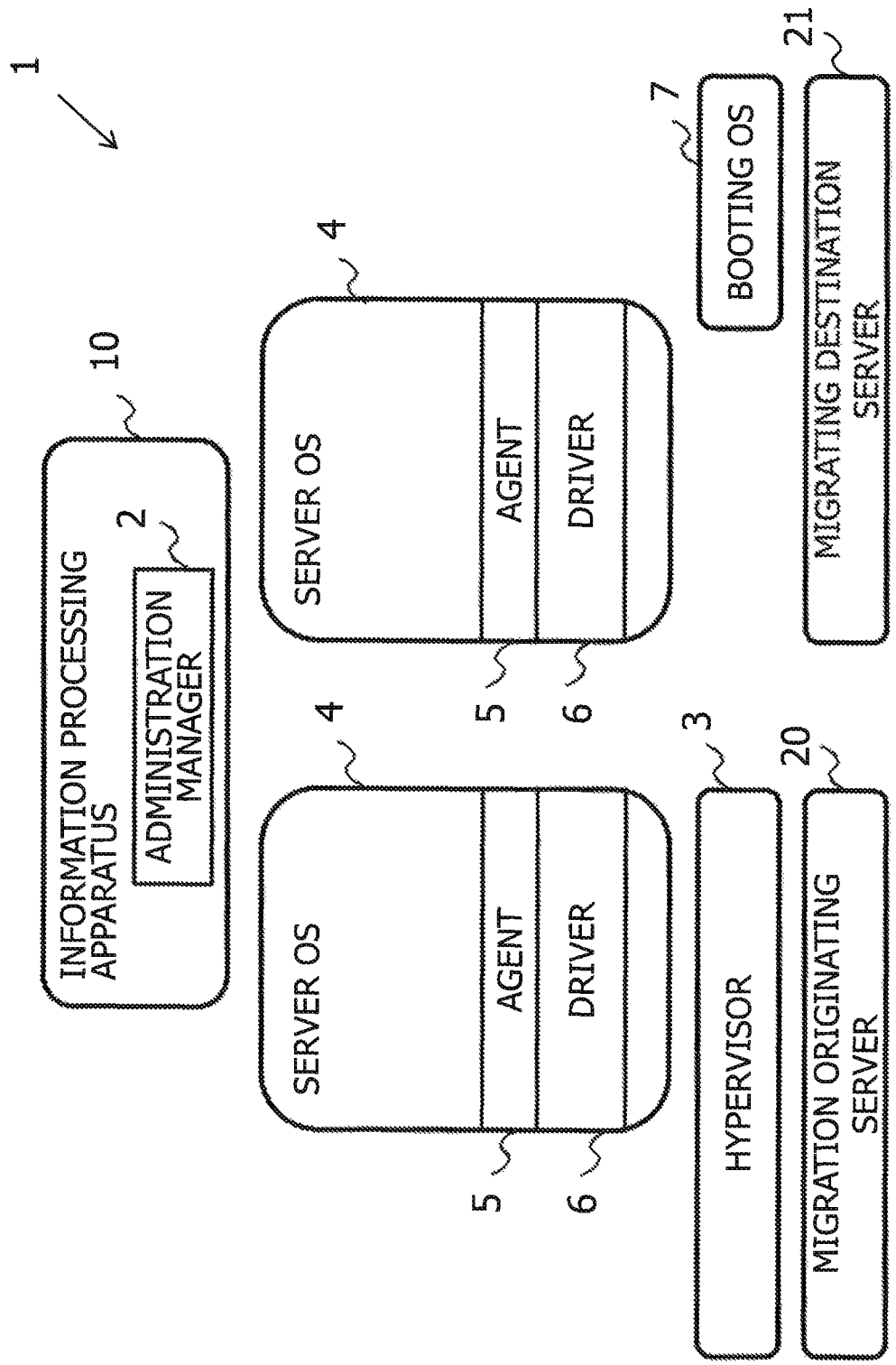
FIG. 1 is a diagram illustrating one example of a system architecture of an information processing system according to a first embodiment.

FIG. 1 is a diagram illustrating one example of a system architecture of an information processing system 1 according to the first embodiment. The information processing system 1 includes an information processing apparatus 10, a migration originating server 20 and a migrating destination server 21. In the first embodiment, the migration originating server 20 is a virtual server, while the migrating destination server 21 is a physical server.

The information processing apparatus 10 has an administration manager 2. The administration manager 2 manages processes for the active migration to the migrating destination server 21 from the migration originating server 20. The administration manager 2 allocates the physical memory areas on migration target server OS 4. The administration manager 2 runs the OS for booting in each of the allocated physical memory areas. The administration manager 2 boots the server OS 4 having migrated to the migrating destination server 21.

The migration originating server 20 has a hypervisor 3. The migration target server OS 4 operates on the hypervisor 3. The server OS 4 includes an agent 5 and a driver 6. The migration originating server 20 is one example of "a first server".

The hypervisor 3 is a program for managing a plurality of virtualized OSs each running on the virtual server. An assumption of an example in FIG. 1 is that one single server OS 4 is currently running. The hypervisor 3 attains virtualization mainly by two methods. A first method is that the hypervisor 3 receives and converts a privileged level instruction instanced by a system call issued by the virtual server, and causes a CPU (Central Processing Unit) to execute the converted instruction. As second method is that the hypervisor 3 receives and hands over the privileged level instruction modified on the side of the virtual server to the CPU, and causes the CPU to execute the instruction.

The hypervisor 3 executes a process of transferring (which will hereinafter be also referred to as "migration") a memory image of the migration target server OS 4. The hypervisor 3 controls the boot of the server OS 4.

The server OS 4 is a migration target OS migrating to the physical server from the virtual server. To be specific, the memory image of the server OS 4 is migrated to the migrating destination server 21 from the migration originating server 20. The agent 5 and the driver 6 on the server OS 4 may be allocated by the administration manager 2 and may also be allocated by a user's operation. The server OS 4 is one example of "OS running on a first server".

The agent 5 performs communications with the administration manager 2. The agent 5 is allocated on a user space defined as a memory area used by an application running on the OS. The agent 5 in the migration originating server 20 allocates the physical memory area via the driver 6 in response to an instruction of the administration manager 2, and notifies the administration manager 2 of an address of the allocated area. The agent 5 is one example of "a controller".

The driver 6, which is a driver used for the migration process of the server OS 4, has a function of allocating the physical memory area by accessing the physical memory. The driver 6 has a communication interface with the agent 5. The driver 6 is allocated on a kernel spaced defined as a memory area used by a kernel serving as a backbone part of the OS. The driver 6 of the migration originating server 20 may also be installed into the server OS 4 by the agent 5 receiving the instruction of the administration manager 2. The driver 6 may also be installed into the server OS 4 by the user's operation. The driver 6, in response to an instruction of the agent 5, allocates the physical memory area and notifies the agent 5 of an address of the allocated physical memory area.

The migrating destination server 21 has OS 7 for booting (Booting OS 7). The server OS 4 migrated to the migrating destination server 21 includes the agent 5 and the driver 6. The migrating destination server 21 is one example of "a second server".

The Booting OS 7 is run by the administration manager 2. The Booting OS 7 receives the migrations of the server OS 4 and CPU control information from the migration originating server 20 to the migrating destination server 21. The Booting OS 7 controls the boot of the server OS 4.

<Hardware Configuration>

Figure 2:
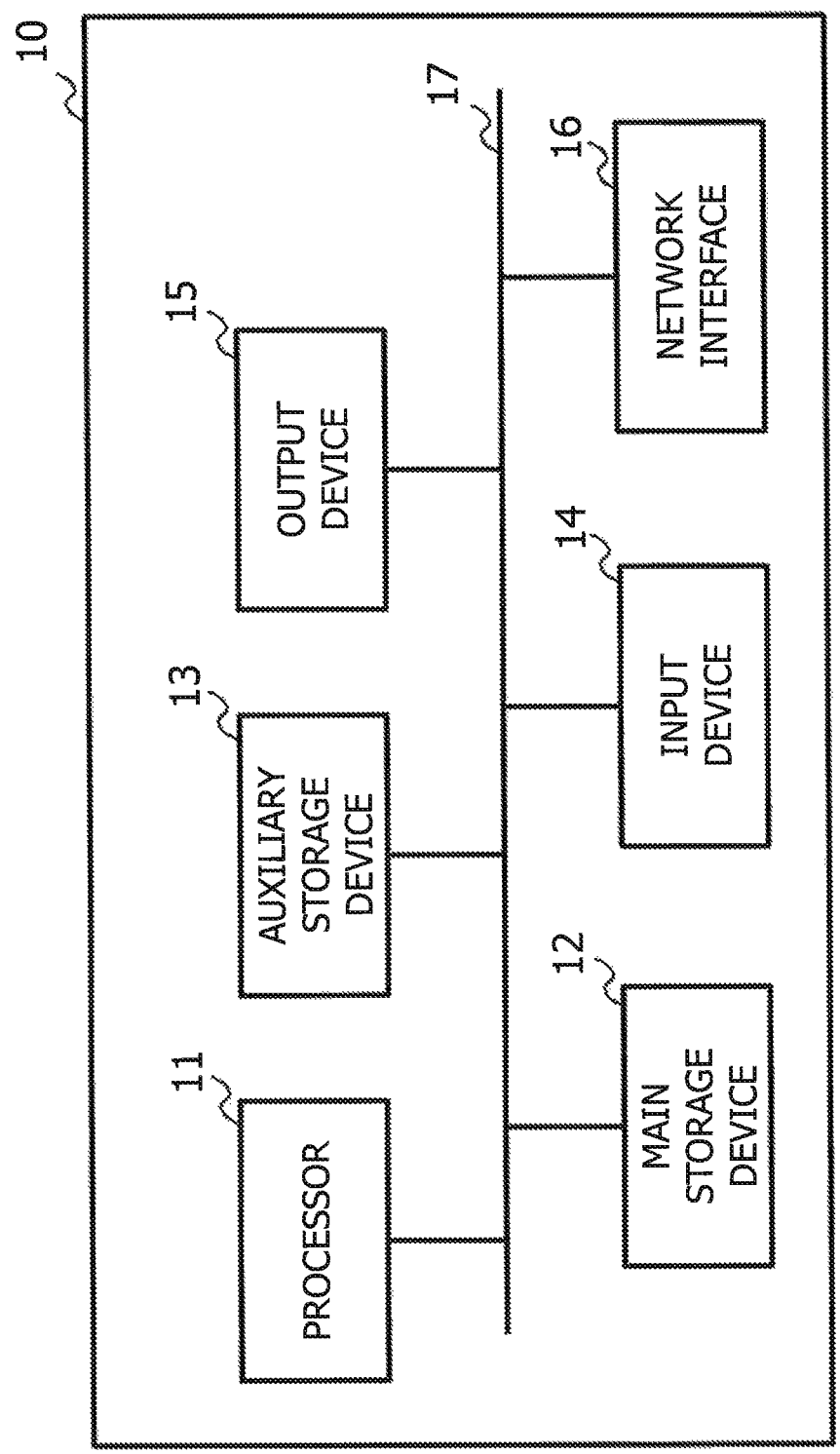
FIG. 2 is a diagram illustrating one example of a hardware configuration of an information processing apparatus.

FIG. 2 is a diagram illustrating one example of a hardware configuration of the information processing apparatus 10. The information processing apparatus 10 includes a processor 11, a main storage device 12, an auxiliary storage unit device 13, an input device 14, an output device 15, and a network interface 16. These components are interconnected via a bus 17.

The processor 11 loads the OS and various categories of computer programs retained by the auxiliary storage unit device 13 onto the main storage device 12, and executes these software components, thereby carrying out a variety of processes. Part of processes of the computer programs may, however, be executed by hardware circuits. The processor 11 is exemplified by a CPU (Central Processing Unit) and a DSP (Digital Signal Processor).

The processor 11 executes, based on the computer program, the processes of the administration manager 2. Part of the processes of the administration manager 2 may, however, be executed by the hardware circuit.

The main storage device 12 provides the processor 11 with a storage area for loading the programs stored in the auxiliary storage unit device 13, and a work area for running the program. The main storage device 12 is used as a buffer for retaining data. The main storage device 12 is, e.g., a semiconductor memory instanced by a ROM (Read Only Memory) and a RAM (Random Access Memory).

The auxiliary storage unit device 13 stores the various categories of programs and the data used for the processor 11 to run the programs. The auxiliary storage unit device 13 is, e.g., a nonvolatile memory instanced by an EPROM (Erasable Programmable ROM) or a hard disk drive (HDD). The auxiliary storage unit device 13 retains, e.g., the OS (Operating System), and information processing program and other various application programs.

The input unit 14 accepts an operation input from the user. The input device 14 is instanced by a pointing device like a touch pad, a mouse and a touch panel, a keyboard, an operation button and a circuit to receive a signal from a remote controller. The output device 15 is, e.g., an LCD (Liquid Crystal Display).

The network interface 16 is an interface for inputting and outputting the information from and to a network. The network interface 16 connects to a wired network or a wireless network. The network interface 16 is instanced by a NIC (Network Interface Card) and a wireless LAN (Local Area Network) card. The data and other equivalent information received by the network interface 16 are output to the processor 11.

For example, the processor 11 of the information processing apparatus 10 loads an information processing program retained by the auxiliary storage unit device 13 into the main storage device 12, and runs this program. Note that the hardware configuration of the information processing apparatus 10 is one example, and the components thereof may be properly omitted, replaced or added corresponding to the embodiments without being limited to the foregoing configuration.

<Hardware-Based Virtualization>

Figure 3:
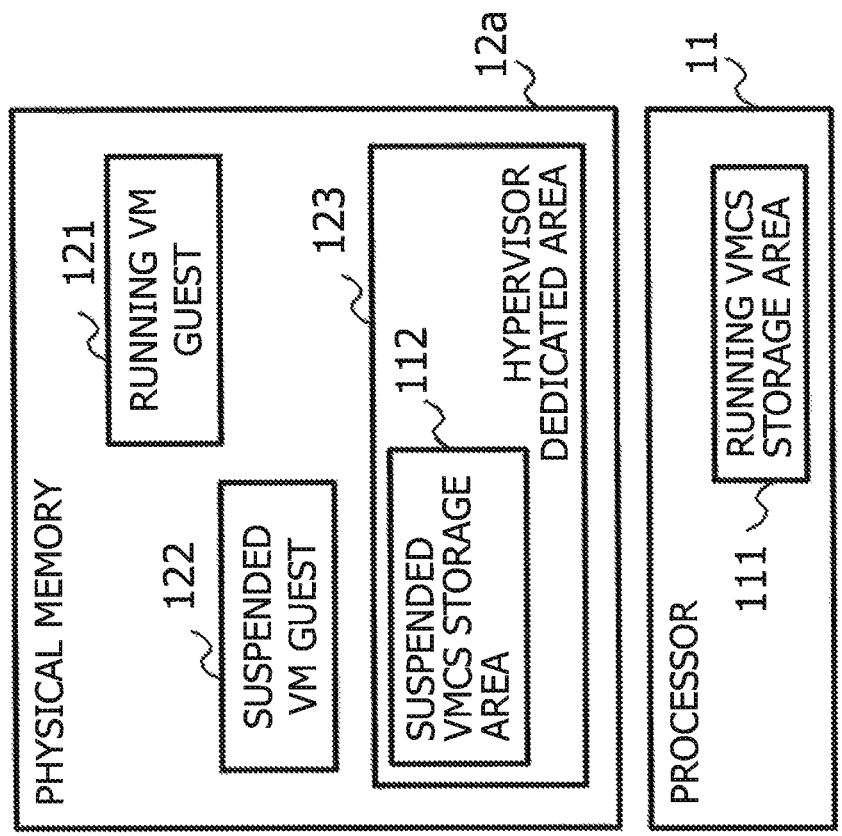
FIG. 3 is a diagram illustrating one example of hardware configurations of a processor and a physical memory.

FIG. 3 is a diagram illustrating one example of hardware configurations of the processor 11 and the physical memory 12*a*. The physical memory 12*a* is one example of the main storage device 12. FIG. 3 depicts an example of the virtualization in a VMX (Virtual Machine eXtensions) mode based on VT-x (Virtualization Technology).

Known as the technology of virtualizing the OS is a method (software-based virtualization) of restricting execution of the privileged instruction in a kernel of a virtualized guest OS by lowering the privileged level of the OS itself. The software-based virtualization entails conversing a machine command and changing the guest OS. Replacement of the machine command on the OS occurs in the case of being virtualized and in the case of running on the physical server.

On the other hand, the hardware-based virtualization technology based on VT-x enables the restriction on the execution of the privileged instruction of the guest OS without changing the guest OS by switching over an operation mode of the processor.

On the occasion of the virtualization of the server OS 4 according to the embodiment, the server OS 4 may be virtualized by the technology of the software-based virtualization. The software-based virtualization involves changing the OS, and hence the first embodiment will be described on the assumption that the server OS 4 is virtualized on hardware basis.

The virtualization technology VT-x defines CPU control information instanced by contexts and operating conditions, based on a data structure called VMCS (Virtual Machine Control Structure). The plurality of OSs running on the server is also referred to as VM (Virtual Machine) guests or guest OSs. The CPU control information based on the VMCS may be set per core in order to efficiently execute the plurality of guests.

The processor 11 includes a running VMCS storage area 111. The running VMCS storage area 111 stores the CPU control information of the running VM guest. The physical memory 12*a* contains an area of a running VM guest 121 and an area of a suspended VM guest 122. The physical memory 12*a* further contains a hypervisor dedicated area 123. The hypervisor dedicated area 123 contains a suspended VMCS storage area 112.

Note that the running VM guest 121 is virtualized on hardware basis by the hypervisor 3 or the Booting OS 7. Note that the running VM guest 121 corresponds to the server OS 4 in the embodiment. The server OS 4 is virtualized on hardware basis similarly to the running VM guest 121 in FIG. 3.

The CPU control information, stored in the running VMCS storage area 111, of the running VM guest 121 is written to the suspended VMCS storage area 112. Next, the physical memory area is allocated, and the suspended VM guest 122 is booted. The running VM guest 121 is then suspended. The control is switched over to the suspended VMCS storage area 112 from the running VMCS storage area 111, thereby running the suspended VM guest 122.

Figure 4:
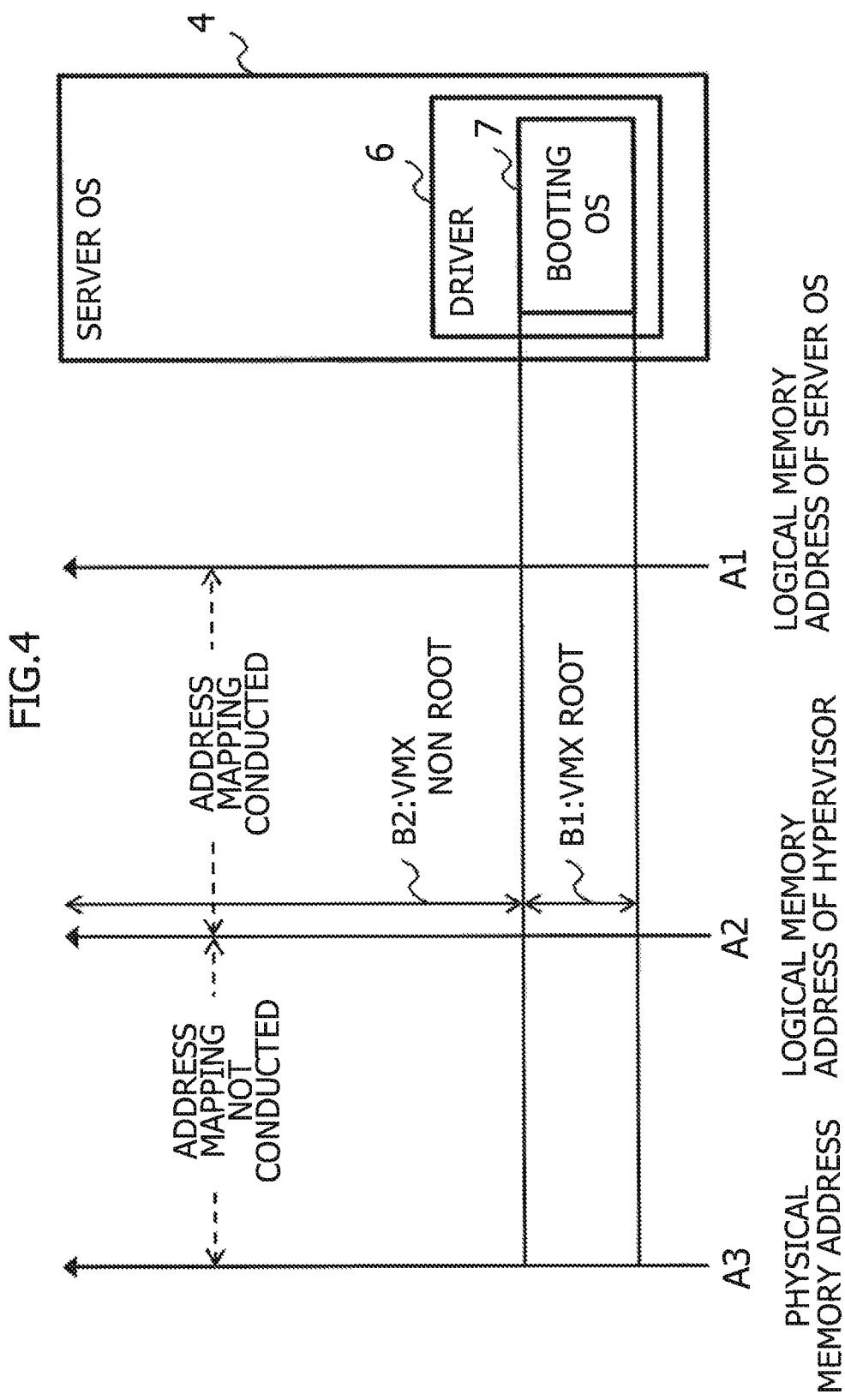
FIG. 4 is a diagram illustrating one example of privileged levels set by hardware-based virtualization.

FIG. 4 is a diagram illustrating one example of the privileged level that is set by the hardware-based virtualization. The server OS 4 is allocated with the driver 6 and the Booting OS 7. An arrow line A1 indicates a logical memory address space of the server OS 4. An arrow line A2 indicates a logical memory address space of the hypervisor 3. An arrow line A3 indicates a physical memory address space.

The logical memory address space of the hypervisor 3 is segmented into a region B1 and a region B2, based on the privileged levels. The region B1 corresponds to the area of the Booting OS 7, and receives setting of a privileged level "VMX ROOT". A privileged level "VMX NON-ROOT" is set in the region B2.

Upon executing a VMXON instruction to operate the hardware-based virtualization, the server OS 4 is disabled from accessing the region B1 having the privileged level "VMX ROOT", i.e., the area of the Booting OS 7. The machine command executed while restricting a privilege in the Booting OS 7 is thereby protected, and the server OS 4 is assured to run on the hypervisor 3.

Address translation between a physical memory address and a logical memory address of the hypervisor 3 is not conducted for keeping consistency of the memory address when running the server OS 4 as the single OS and when running the server OS 4 as the guest OS. Note that the address translation between the logical memory address of the server OS 4 and the logical memory address of the hypervisor 3, is conducted in the same manner as before the hardware-based virtualization.

Processing Example of First Embodiment

The administration manager 2 performs the active migration to the migrating destination server 21 defined as the physical server from the migration originating server 20 defined as the virtual server by (1-1) allocating the physical memory area at a migration originating server, (1-2) running the Booting OS at a migrating destination server, (1-3) reconfiguring a memory area, and (1-4) booting the server OS at a migrating destination server.

The physical memory area for the Booting OS 7 is allocated when booting the server OS 4. In the active migration to the physical server from the virtual server, it is desirable for causing the running server OS 4 to re-run on the migration destination physical server that the Booting OS 7 is loaded in the same address as the address of the physical memory area at the migration originating server. The administration manager 2 allocates the physical memory area in the migration originating server 20 via the agent 5 and the driver 6, and notifies the address of the allocated physical memory area to the Booting OS 7 of the migrating destination server 21. The Booting OS 7 runs at the address of the allocated physical memory area in the migrating destination server 21.

(1-1) Allocating of Physical Memory Area at Migration Originating Server

Figure 5:
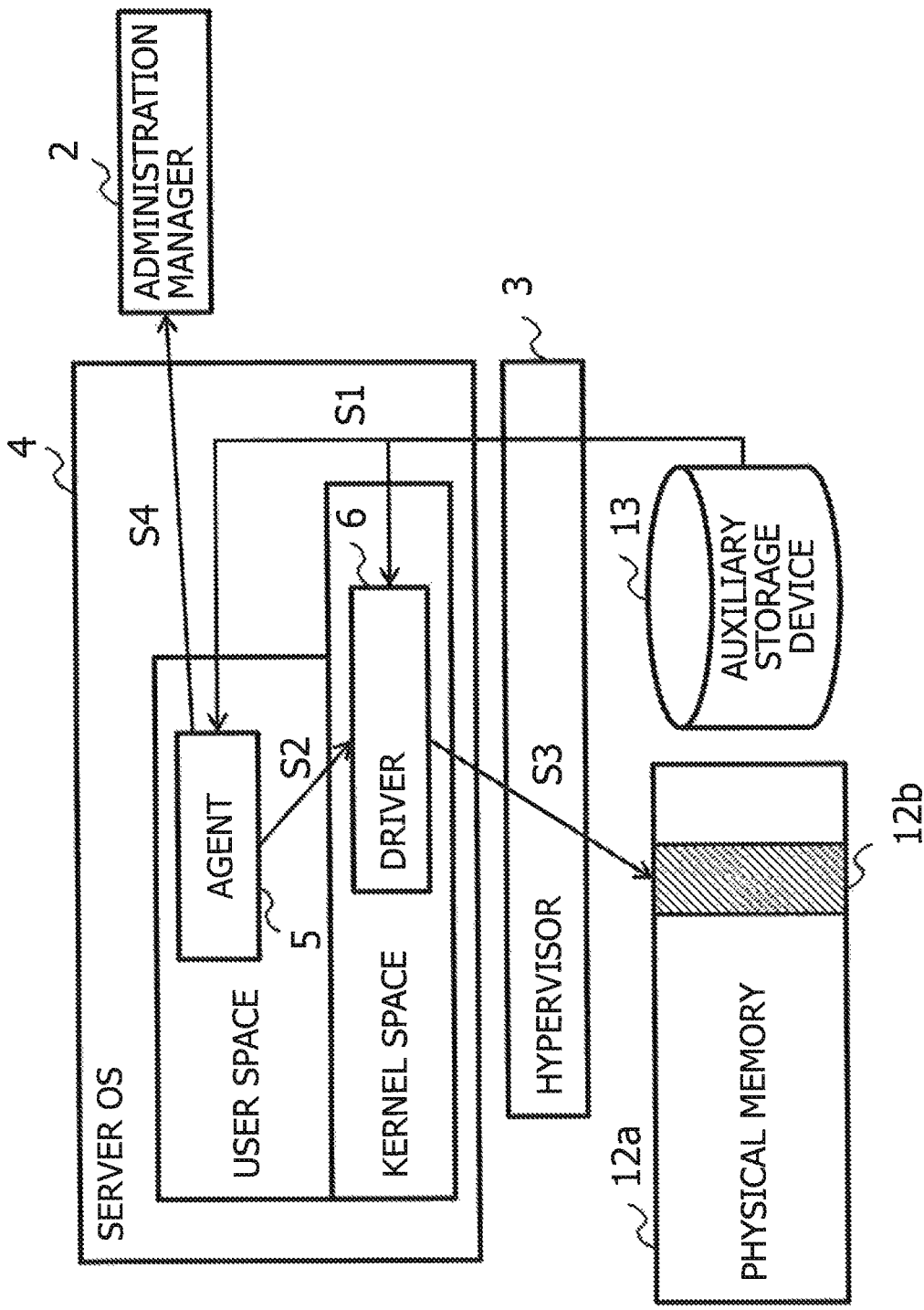
FIG. 5 is a diagram illustrating an operational example of allocating a physical memory area according to the first embodiment.

FIG. 5 is a diagram illustrating an operational example of how the physical memory area is allocated according to the first embodiment. The server OS 4 runs on the hypervisor 3. The administration manager 2 accesses the migration originating server 20, and allocates the agent and the driver 6 in a file system on the server OS 4 (S1). The agent 5 is allocated in a user space of the server OS 4. The driver 6 is allocated in a kernel space of the server OS 4.

The administration manager 2 can acquire the agent 5 and the driver 6 to be allocated on the server OS 4 from the auxiliary storage unit device 13. The administration manager 2 may acquire the agent 5 and the driver 6 from outside via the network interface 16.

The administration manager 2 instructs the agent 5 to allocate the physical memory area. The agent 5 installs the driver 6 into the server OS 4, and instructs the driver 6 to allocate the physical memory area (S2).

The driver 6 allocates the physical memory area indicated by hatching in FIG. 5 (S3). The driver 6 notifies the agent 5 of an address of an allocated physical memory area 12b. The agent 5 also notifies the administration manager 2 of the notified address (S4).

Figure 6:
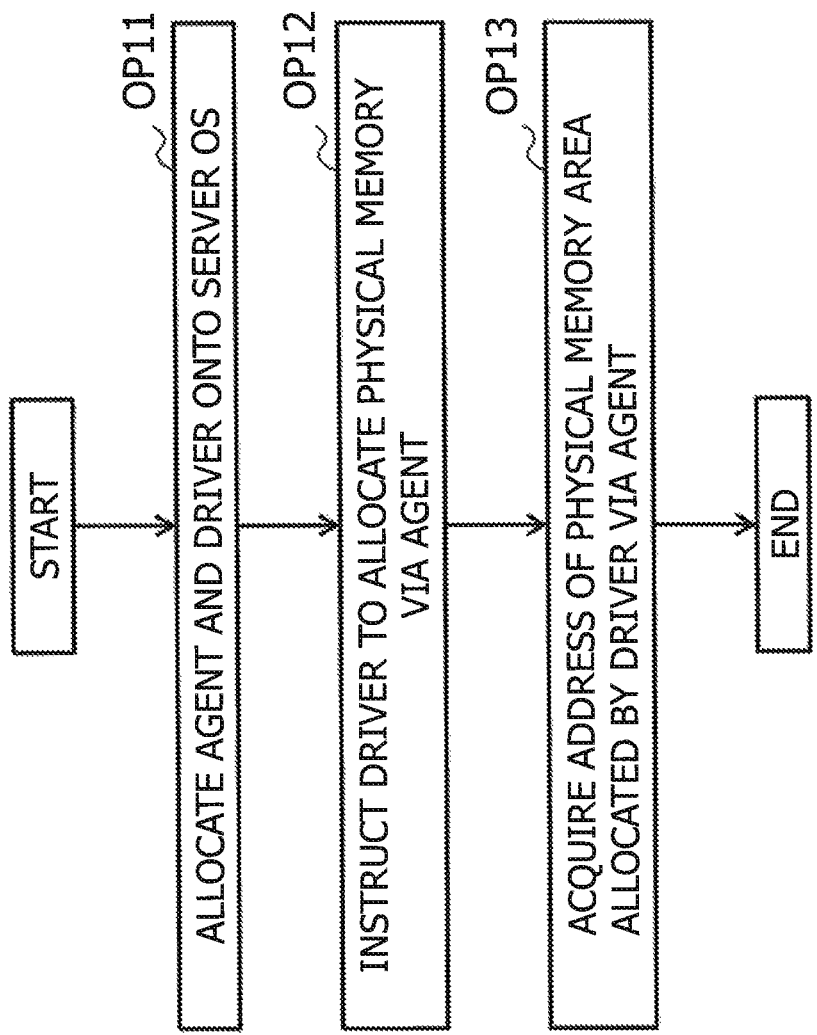
FIG. 6 is a flowchart of one example of a process of allocating the physical memory area on server OS.

FIG. 6 is a flowchart of one example of a process of allocating the physical memory area in the server OS 4. The process of allocating the physical memory area is started by an instruction of the administration manager 2 before running the Booting OS 7 in the active migration to the physical server from the virtual server. Note that the processor 11 is a subject of executing the processes illustrated in FIG. 6, and the processes will, however, be described on the assumption that the administration manager 2 is a subject of the operation.

In OP11, the administration manager 2 allocates the agent 5 and the driver 6 in the file system on the server OS 4. Next, the processing advances to OP12. In OP12, the administration manager 2 instructs the driver 6 to allocate the physical memory area via the agent 5. The allocating of the physical memory area in the migration originating server intends to equalize a state of the physical memory of the migration originating server to a state of the physical memory of the migrating destination server by allocating the same physical memory area in the migrating destination server as the physical memory area in the migration originating server. Next, the processing advances to OP13. In OP13, the administration manager 2 acquires the address of the physical memory area allocated by the driver 6 via the agent 5. The administration manager 2 acquires also a memory mode of the processor 11. The memory mode represents a variety of parameters pertaining to the performance and an operation of the processor 11. Thereafter, the processes illustrated in FIG. 6 are finished.

Figure 7:
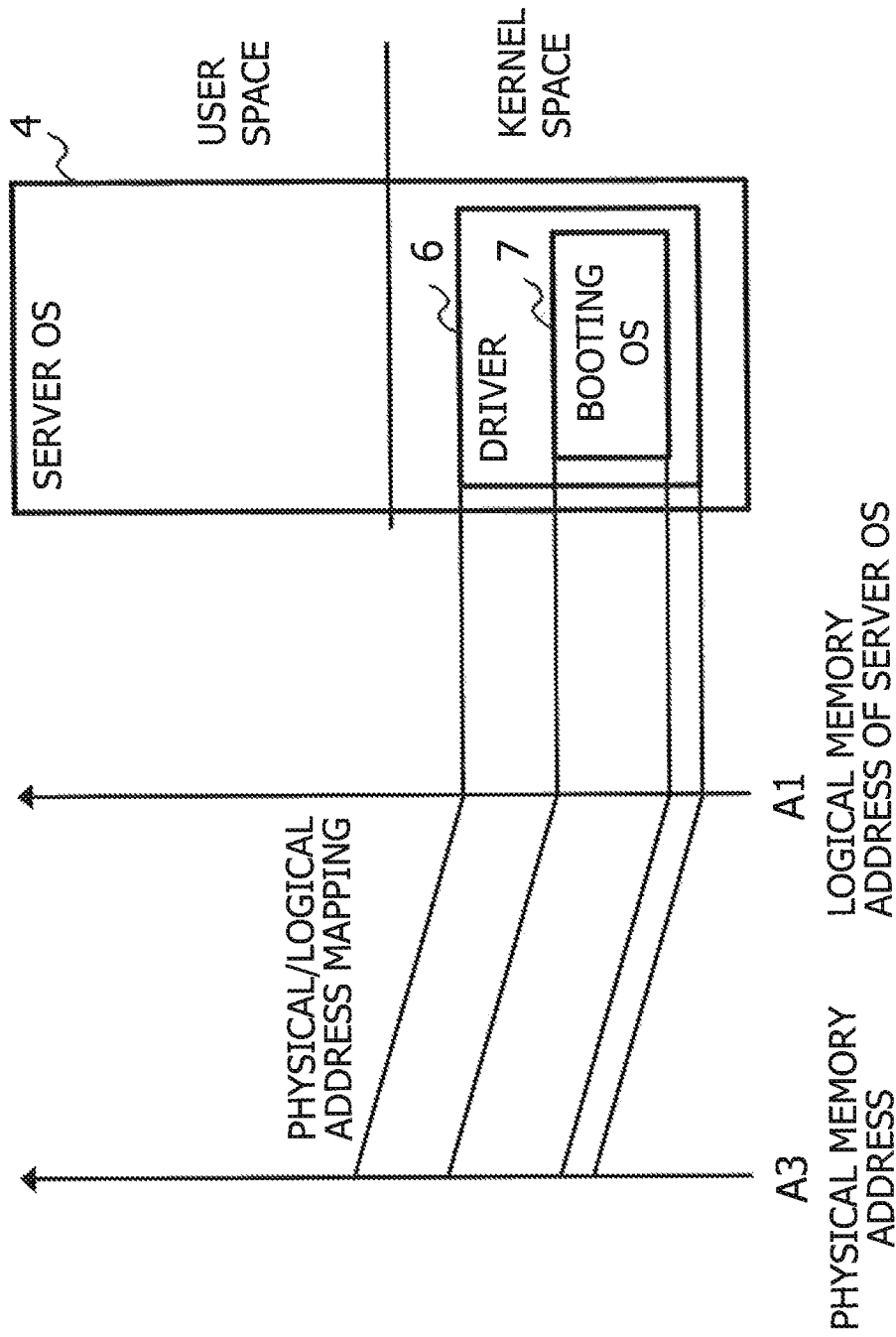
FIG. 7 is a diagram illustrating an example of allocating Booting OS, a driver and other equivalent components on a memory space.

FIG. 7 is a diagram illustrating an allocation example of the Booting OS 7, the driver 6 and other equivalent components on the memory space. FIG. 7 illustrates how address mapping between the logical address and the physical address is carried out. The server OS 4 allocates the driver 6 and the Booting OS 7 in an area set as the kernel space in the logical memory address space. An allow line A1 indicates the logical memory address space of the server OS 4. An arrow line A3 indicates an address space of the physical memory.

The driver 6, upon allocating the physical memory area, acquires an address for allocating the Booting OS 7 through the address mapping conducted by the server OS 4. The physical address and the logical address are mapped based on a paging method of managing the memory space on a page-by-page basis or a segment method of managing the memory space on a segment-by-segment basis with segments being classified by information attributes.

Note that the privileged level is set on the logical address corresponding to each method. The paging method sets whether the privilege is given on the page-by-page basis. The segment method sets the privileged levels of rings 0 through 3 in the sequence from the highest of security on the segment-by-segment basis.

(1-2) Running of Booting OS at Migrating Destination Server

Figure 8:
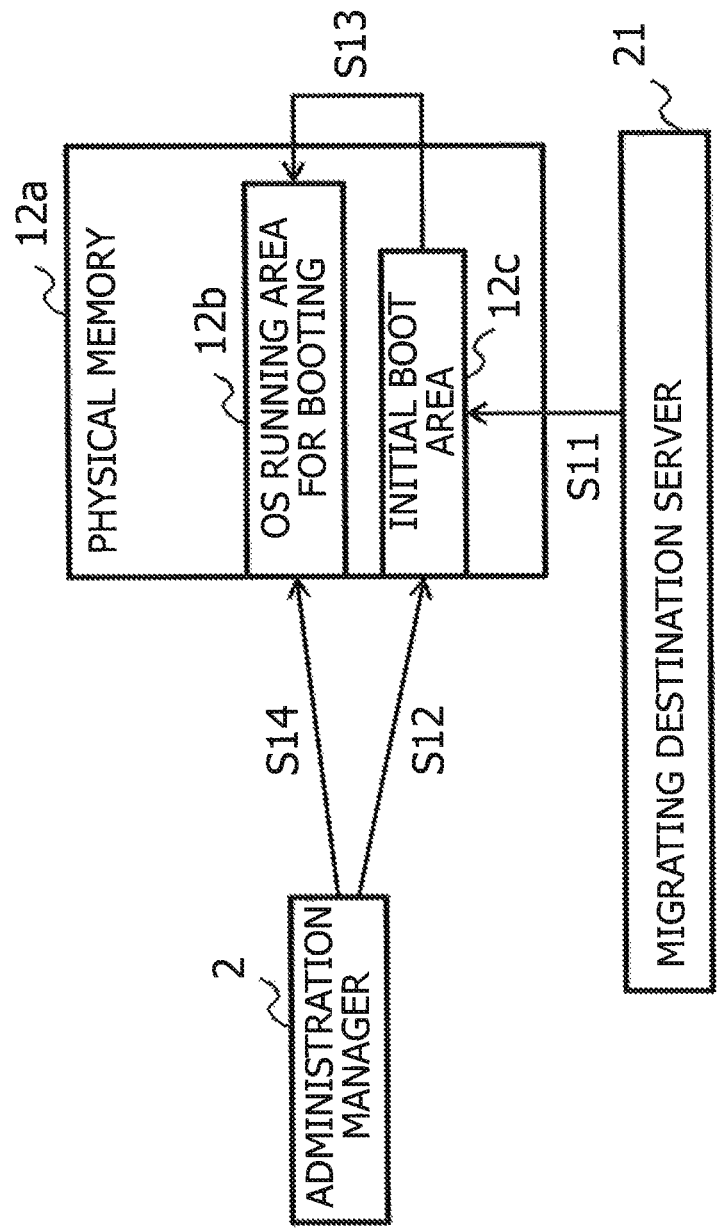
FIG. 8 is a diagram illustrating an operational example of running the Booting OS at a migrating destination server.

FIG. 8 is a diagram illustrating an operational example of how the Booting OS runs on the migrating destination server 21. In FIG. 8, the migrating destination server 21 is the physical server. The Booting OS 7 executes processes of the operational example illustrated in FIG. 8 in response to an instruction of the administration manager 2.

The Booting OS 7 is booted in an initial boot area 12c on the physical memory 12a of the migrating destination server 21 (S11). The Booting OS 7 shifts to the memory mode acquired by the administration manager 2 together with the address of the physical memory area in OP13 of FIG. 6.

The Booting OS 7 acquires the address of the physical memory area allocated on the server OS 4 of the migration originating server 20 from the administration manager 2 (S12). The acquired address of the physical memory area is used as an address of a Booting OS running area 12b in the migrating destination server 21. The Booting OS 7 migrates to the Booting OS running area 12b from the initial boot area 12c on the physical memory 12a (S13). The processes in S12, S13 cause the Booting OS 7 to run in the physical memory area of the migrating destination server 21 specified by the address of the physical memory area allocated by the migration originating server 20. As a result, the Booting OS 7 runs in the migrating destination server 21 in a coincident state of the allocating status of the physical memory area between the migration originating server 20 and the migrating destination server 21.

The Booting OS 7 acquires connecting information of the migration originating server 20 from the administration manager 2 (S14). The connecting information is defined as identifying information instanced by an IP (Internet Protocol) address and public key data. The migrating destination server 21 permits a connection given from the migration originating server 20 by using the connecting information. The Booting OS 7 runs in Booting OS running area 12b.

Figure 9:
FIG. 9 is a flowchart of one example of a process of running the Booting OS at the migrating destination serve.

FIG. 9 is a flowchart of one processing example of running the Booting OS in the migrating destination server 21. A start of the process of running the Booting OS is triggered by an instruction of the administration manager 2 after allocating the physical memory area for the Booting OS 7 in the active migration to the physical server from the virtual server. Note that the processor 11 is the subject of executing the processes illustrated in FIG. 9, and the processes will, however, be described on the assumption that the Booting OS 7 is the subject of the operation.

In OP21, the Booting OS 7 is booted by the migrating destination server 21. Next, the processing advances to OP22. In OP22, the Booting OS 7 shifts to the memory mode, acquired from the administration manager 2, in the migration originating server 20. Subsequently, the processing advances to OP23.

In OP23, the Booting OS 7 acquires the address of the allocated physical memory area from the administration manager 2. Next, the processing advances to OP24. In OP24, the Booting OS 7 migrates to the physical memory area specified by the acquired address. Subsequently, the processing advances to OP25.

In OP25, the Booting OS 7 acquires the connecting information of the migration originating server 20 from the administration manager 2. The migrating destination server 21 permits the connection given from the migration originating server 20 by using the acquired connecting information. The permission of the connection enables the migration originating server 20 to migrate the memory image of the server OS and the control information of the processor 11 to the migrating destination server 21. Next, the processing advances to OP26. In OP26, the Booting OS 7 runs at the address of the migrating destination server. Thereafter, the processes illustrated in FIG. 9 are finished.

Figure 10:
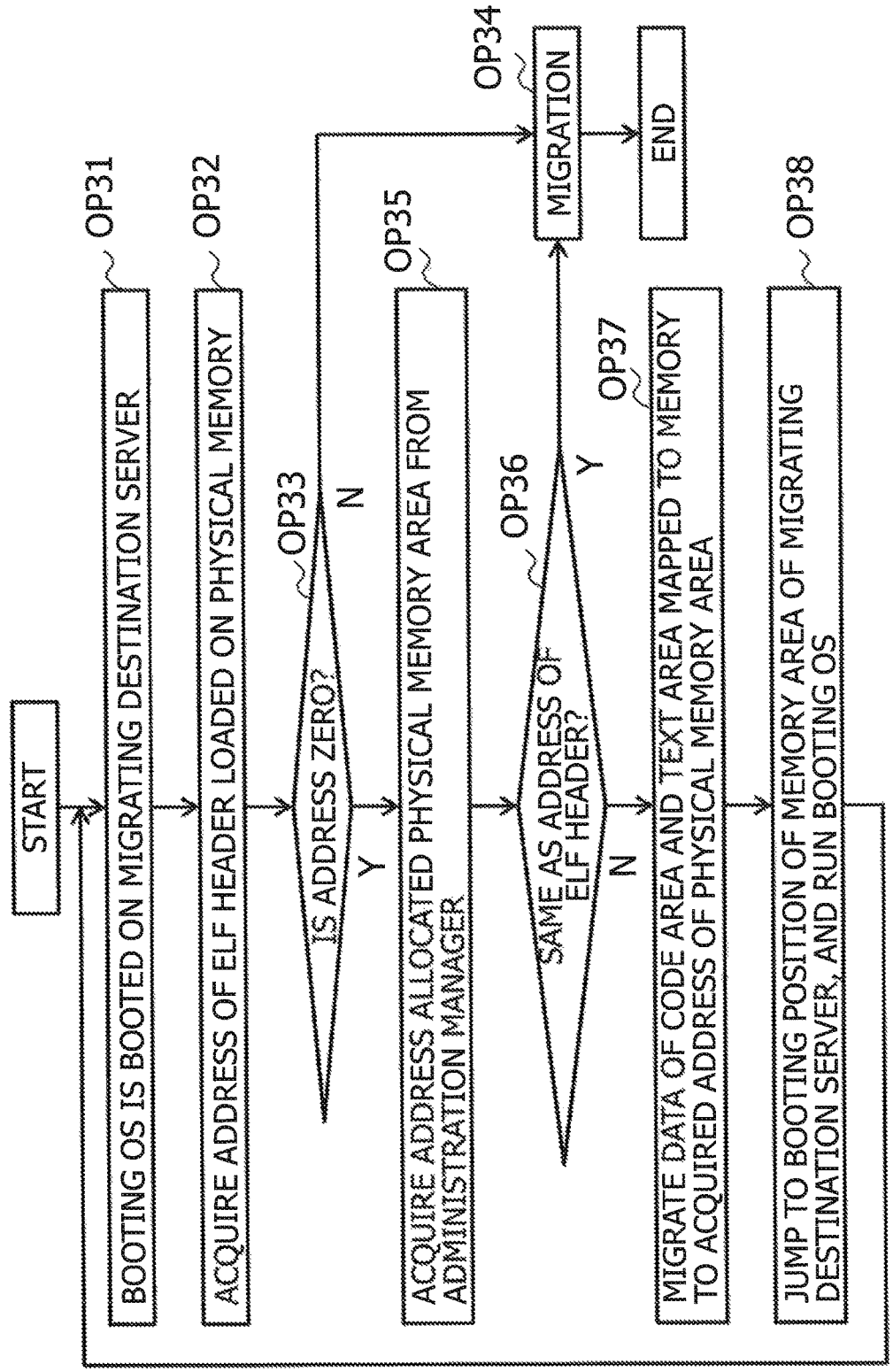
FIG. 10 is a flowchart of a specific example of the process of running the Booting OS at the migrating destination server.

FIG. 10 is a flowchart of a specific example of the process of running the Booting OS in the migrating destination server. In other words, FIG. 10 illustrates a materialized example of the processes depicted in FIG. 9. A start of the process of running the Booting OS is triggered by an instruction of the administration manager 2 after allocating the physical memory area for the Booting OS 7 in the active migration to the physical server from the virtual server. Note that the processor 11 is the subject of executing the processes illustrated in FIG. 10, and the processes will, however, be described on the assumption that the Booting OS 7 is the subject of the operation.

In OP31, the Booting OS 7 is booted by the migrating destination server 21. Next, the processing advances to OP32. In OP32, the Booting OS 7 checks the allocation of the physical memory in executable codes with information described in an ELF (Executable and Linking Format) format. Specifically, the Booting OS 7 acquires the address of the physical memory area specified by ELF Header deployed on the physical memory. The acquired address is a current address (the address of the initial boot area 12c in FIG. 8) of the Booting OS 7 booted by the migrating destination server 21. Next, the processing advances to OP33.

IN OP33, the Booting OS 7 determines whether the current address, acquired in OP32, of the Booting OS 7 indicates an initial value, e.g., zero. When the current address of the Booting OS 7 is zero (OP33: Y), the processing advances to OP35. Whereas when the current address of the Booting OS 7 is not zero, i.e., when the Booting OS 7 moves from zero (the initial value) to another address through processes in OP35 through OP38 (OP33: N), the processing advances to OP34. In OP34, the Booting OS 7 performs the migration designed as the transfer process of the server OS 4. Thereafter, the processes illustrated in FIG. 10 are terminated.

In OP35, the Booting OS 7 acquires the address of the allocated physical memory area from the administration manager 2. Subsequently, the processing advances to OP36. In OP36, the Booting OS 7 determines whether the address acquired in OP35 is the same as the address of EFL Header, i.e., the current address acquired in OP32. When the address acquired in OP35 is the same as the current address (OP36: Y), the processing diverts to OP34. Whereas when the address acquired in OP35 is not the same as the current address (OP36: N), the processing advances to OP37.

In OP37, the Booting OS 7 migrates data in a code area and data in a text area, which are mapped to the memory, to the address, acquired in OP35, of the physical memory area. In OP37, the Booting OS 7 does not migrate a stack area and a heap area defined memory areas to be used temporarily. Next, the processing advances to OP38. In OP38, the Booting OS 7 jumps to a boot position of the memory area of the migrating destination server to boot the Booting OS. Subsequently, the processing loops back to OP31.

(1-3) Reconfiguration of Memory Area

After running the Booting OS 7, the administration manager 2 changes, before starting the migration, a configuration of a pseudo physical memory allocated to the virtual server on the hypervisor 3 of the migration originating server 20 to take the same configuration as the configuration of the physical memory of the migrating destination server 21. The administration manager 2 can acquire information about the configuration of the physical memory of the migrating destination server 21 from the Booting OS 7 in the process of, e.g., OP23 or OP25 in FIG. 9.

Specifically, the administration manager 2 performs a process of changing a size of the pseudo physical memory of the virtual server to a size of the physical memory of the migrating destination server 21, and other equivalent processes. Note that the configuration of the pseudo physical memory of the virtual server does not need to be the same as the configuration of the physical memory of the migrating destination server 21, and may simply be changed to enable the migration of the server OS 4.

Figure 11:
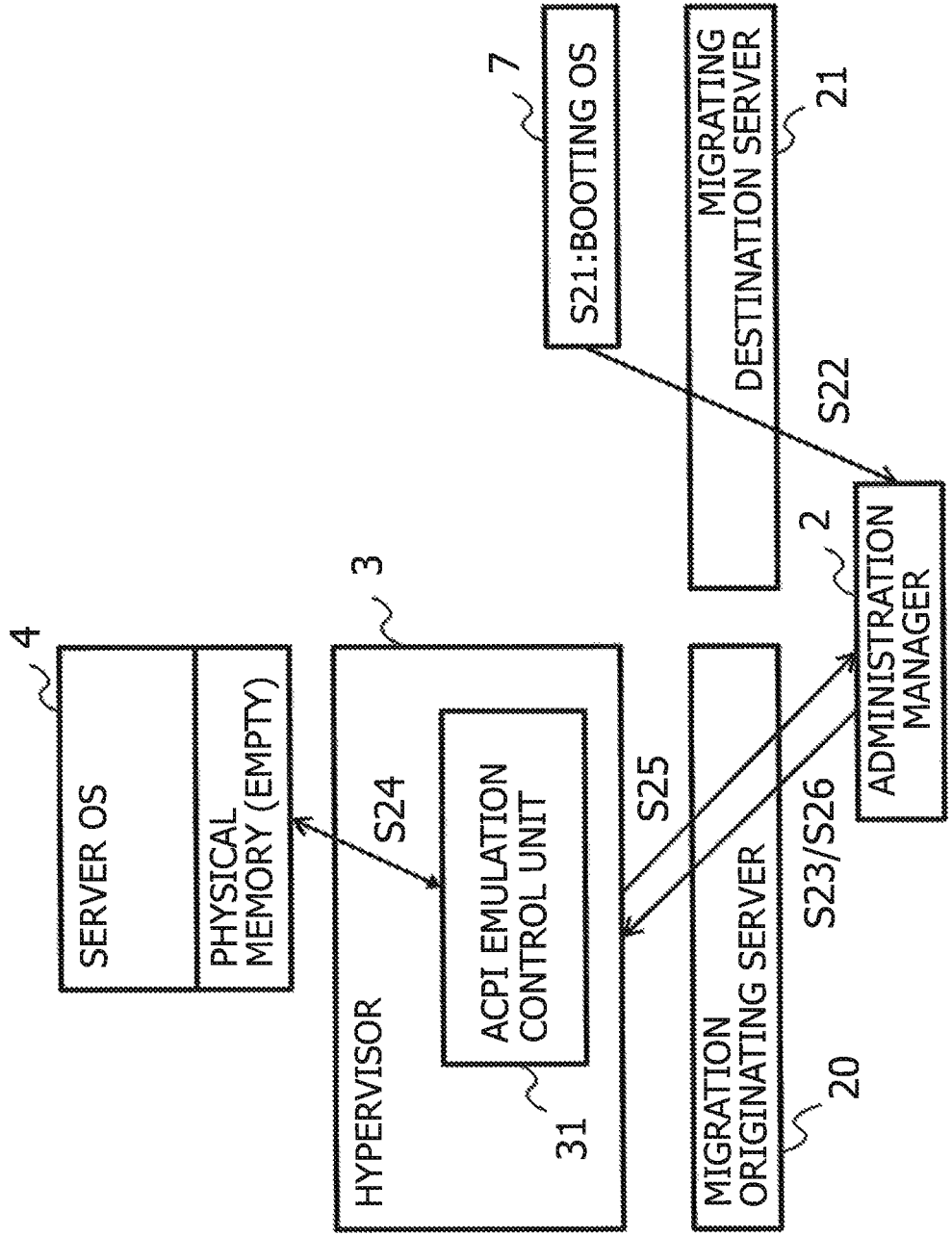
FIG. 11 is a diagram illustrating an operational example of changing a memory configuration of the virtual server of a migration originating server.

FIG. 11 is a diagram illustrating an operational example of changing the memory configuration of the virtual server of the migration originating server. The administration manager 2 causes the Booting OS 7 to acquire information about the configuration of the physical memory area of the migrating destination server (S21).

The administration manager 2 acquires the configuration information of the physical memory area from the Booting OS 7 (S22). The administration manager 2 notifies the hypervisor 3 that the configuration of the physical memory area of the server OS 4 of the migration originating server 20 is to be changed (S23).

The hypervisor 3 includes an ACPI (Advanced Configuration and Power Interface) emulation control unit 31. Emulation connotes that the software developed for specified hardware and OS is executed in a pseudo manner under a different operating environment. Herein, the emulation encompasses running the server OS 4 on the hypervisor 3, the hypervisor 3 being designed to run on the physical server. A term "emulate" is applied to a switchover to running on the hypervisor 3. The ACPI emulation control unit 31 controls an operation for the ACPI.

The hypervisor 3 notifies the server OS 4 through the ACPI emulation control unit 31 that the memory falls into a failure or is added in the pseudo manner. The hypervisor 3 changes, through the ACPI emulation control unit 31, an allocation of the physical memory area to the server OS 4 (S24). The hypervisor 3 make changes to reduce the memory size in response to the notification of the failure of the memory, and to augment the memory size in response to the notification of adding the memory. In the process of S24, the memory configuration of the migration originating server 20 is changed matching with the memory configuration of the migrating destination server 21. The hypervisor 3, after completing the change of the allocation, notifies the administration manager 2 of a purport that the change of the configuration information has been completed (S25). The administration manager 2 starts the migration (S26).

Figure 12:
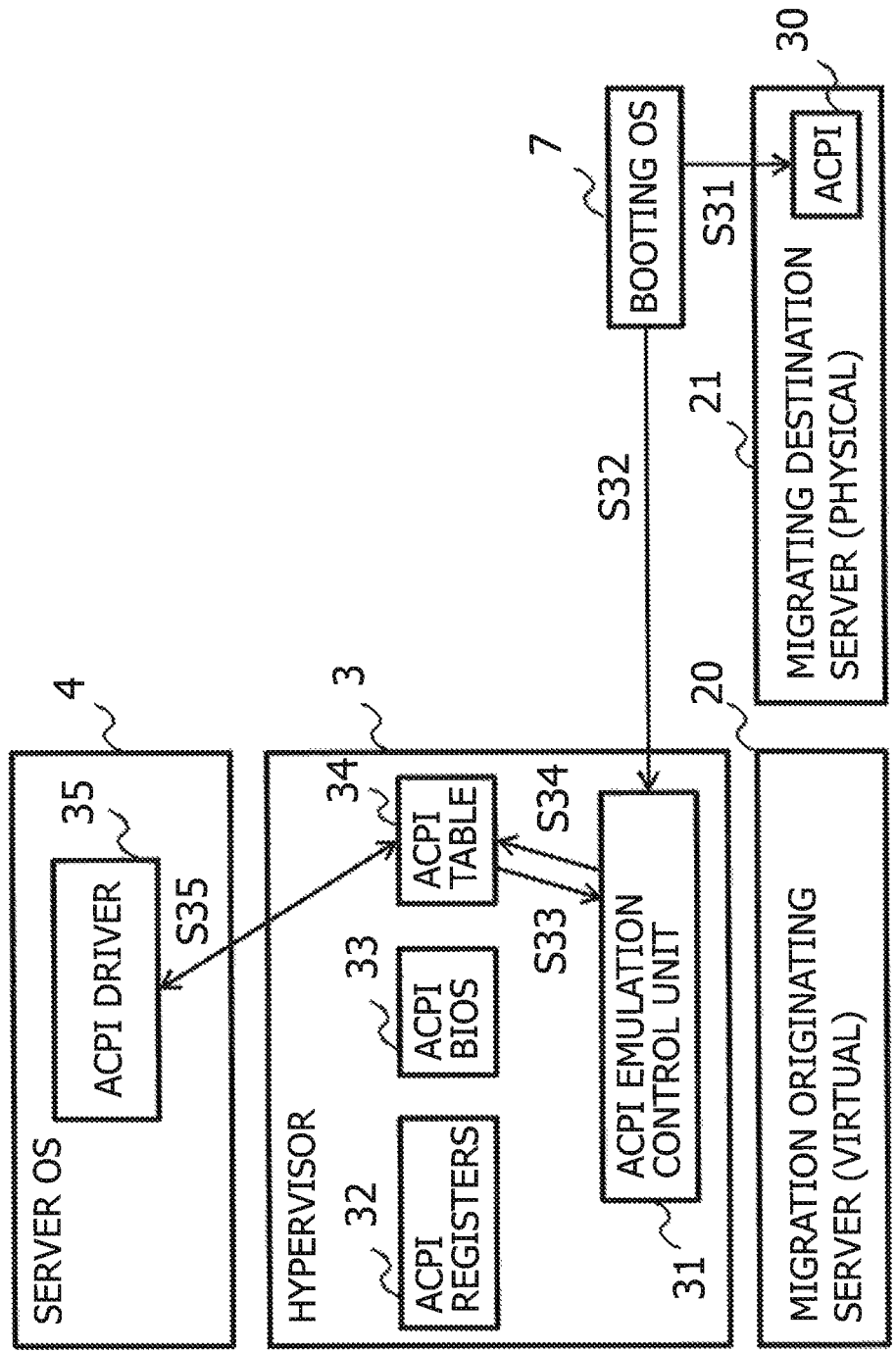
FIG. 12 is a diagram illustrating an operational example of changing the memory configuration based on ACPI (Advanced Configuration and Power Interface)

FIG. 12 is a diagram illustrating an operational example of changing the memory configuration based on the ACPI. To begin with, a functional configuration will be described in FIG. 12. The migrating destination server 21 includes an ACPI 30. The ACPI 30 is a programmable interface for cooperation between a body apparatus of the server and the software. The ACPI 30 functions as part of BIOS (Basic Input/Output System).

The server OS 4 is the virtual server running on the hypervisor 3. The server OS 4 includes an ACPI driver 35. The ACPI driver 35 is software for controlling and operating the ACPI.

The hypervisor 3 includes the ACPI emulation control unit 31, ACPI Registers 32, an ACPI BIOS 33 and an ACPI Table 34. The ACPI emulation control unit 31 is the same as in FIG. 11, and hence its explanation is omitted.

The ACPI Registers 32 are a group of registers retained by ACPI-supported hardware devices. The ACPI BIOS 33 is a BIOS function group for operating the ACPI 30. The ACPI Table 34 is registered with a management target device group by the ACPI 30.

The ACPI Registers 32 and the ACPI Table 34 are allocated in the memory area for BIOS on the server OS 4. The ACPI Registers 32 are readable and writable, while the ACPI Table 34 is readable.

Next, the operational example will be described in FIG. 12. The Booting OS 7 acquires the information of the memory configuration from the ACPI 30 of the migrating destination server 21 (S31), and notifies the ACPI emulation control unit 31 of the acquired information (S32).

The ACPI emulation control unit 31 acquires the information of the memory configuration from the ACPI Table 34 of the server OS 4 being emulated by the migration originating server 20. The ACPI emulation control unit 31 compares the information of the memory configuration acquired from the migrating destination server 21 with the information of the memory configuration acquired from the migration originating server 20, thus determining a change content of the information of the memory configuration (S33).

The ACPI emulation control unit 31 changes, based on a result in S33, the information of the memory configuration of the ACPI Table 34 of the server OS 4 being emulated (S34). The ACPI emulation control unit 31 causes occurrence of GPE (General Purpose Event) to the server OS 4. The ACPI emulation control unit 31 makes an interrupt request based on IRQ (Interrupt ReQuest) 9. In response to the interrupt request, the ACPI driver 35 reads the ACPI Table 34, and reflects the change of the information of the memory configuration (S35).

(1-4) Boot of Server OS at Migrating Destination Server

Figure 13:
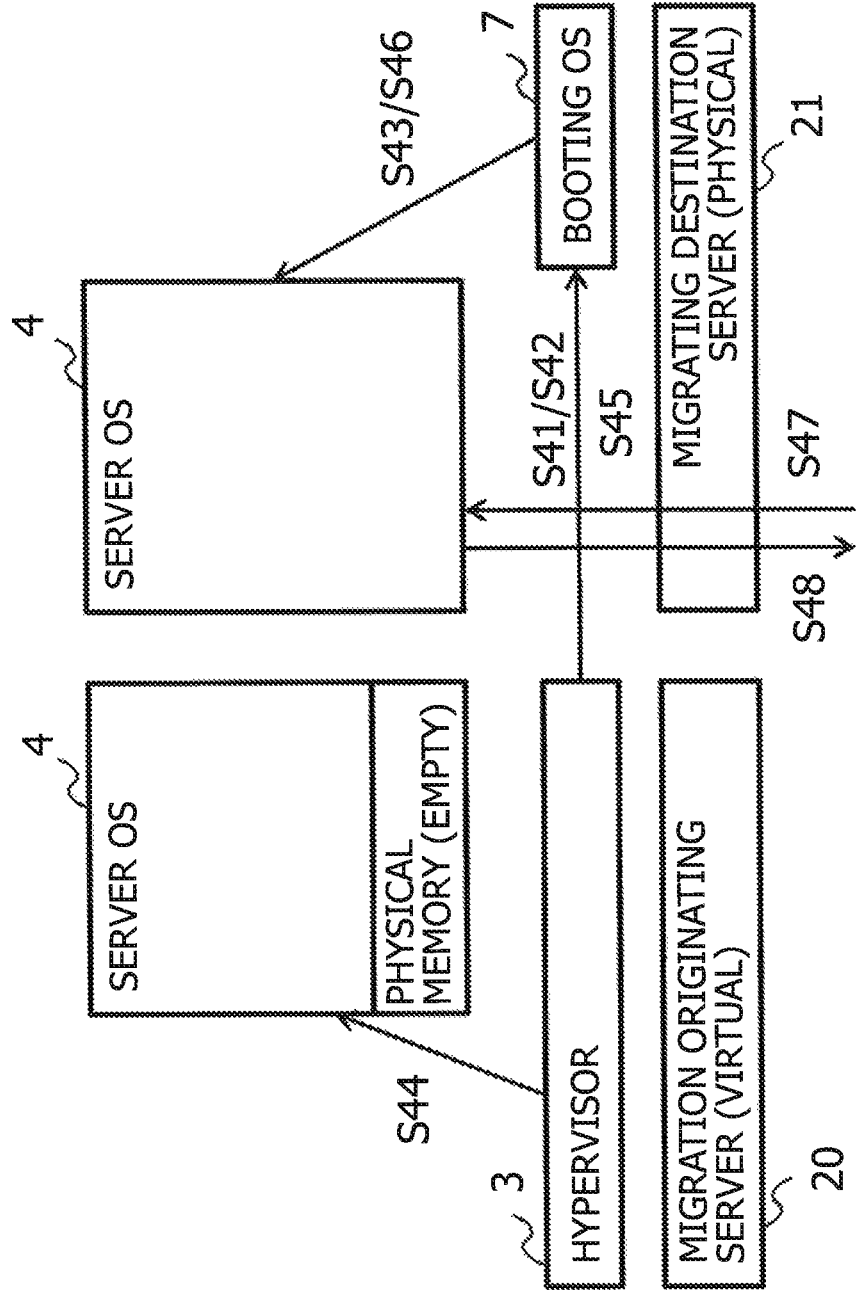
FIG. 13 is a diagram illustrating an operational example of booting server OS at the migrating destination server according to the first embodiment.

FIG. 13 is a diagram illustrating an operational example of booting the server OS 4 at the migrating destination server 21 according to the first embodiment. The Booting OS 7, upon the instruction of the administration manager 2, accepts the communication from the hypervisor 3 (S41).

The hypervisor 3 transfers a pseudo physical page of the server OS 4 of the migration originating server to the migrating destination server 21 (S42). Note that the physical memory area allocated for the Booting OS 7 is empty and is not therefore transferred.

The Booting OS 7 accepts the data transferred from the hypervisor 3 and writes the data to the physical memory (S43). The hypervisor 3 changes a state of the server OS 4 of the migration originating server to an ACPI S3 (halt) state (S44).

The hypervisor 3 transfers the CPU control information of the server OS 4 of the migration originating server to the migrating destination server 21 (S45). The Booting OS 7 changes a state of the server OS 4 of the migrating destination server to the ACPI S3 state (S46).

The administration manager 2 transmits a Wake On Lan packet to the server OS 4 of the migrating destination server via the network, thereby setting the server OS 4 of the migrating destination server in a boot state (S47). "Wake On Lan" is a technology of remotely switching ON a power source of the computer connected to the network, and enables self power-ON by transmitting the Wake On Lan packet to the computer.

The server OS 4 of the migrating destination server may be booted by setting a wake-up timer as a function of the ACPI 30 before the switchover to the server OS 4 of the migrating destination server from the Booting OS 7.

The agent 5 on the server OS 4 of the migrating destination server issues network reset notification (S48). To be specific, the agent 5 updates an IP address of the server OS 4, and broadcasts GARP (Gratuitous Address Resolution Protocol) and other equivalent protocols. The GARP is transmitted for checking whether the IP address is overlapped within the same network and for updating an ARP cache on a network device on the same segment. The GARP may also be transmitted by the Booting OS 7.

Operational Effect of First Embodiment

According to the first embodiment, the administration manager 2 allocates the agent 5 and the driver 6 on the server OS 4, and the migration originating server 20 allocates the physical memory area for loading the Booting OS 7 at the migration originating server 20. The administration manager 2 runs the Booting OS 7 in the address of the allocated physical memory area at the migrating destination server 21 as the physical server. The Booting OS 7 accepts the image data of the physical memory of the server OS 4 from the hypervisor 3 of the migration originating server 20, and maps the data onto the memory of the migrating destination server 21. The administration manager 2 boots the server OS 4. A physical address of the physical memory area in the migrating destination server 21 is equalized to the address of the physical memory area allocated in an operating status of the migration originating server 20, thereby enabling the active migration to the physical server from the virtual server and facilitating operation management of the server.

The administration manager 2 changes, before the migration to the physical server from the virtual server, the configuration of the memory area of the virtual server as the migration originating server to match with the configuration of the memory area of the physical server as the migrating destination server. In other words, the first embodiment involves an adjustment to equalize the state of the physical memory of the migrating destination server 21 after booting the Booting OS 7 in the migrating destination server 21 to the state of the pseudo physical memory on the hypervisor 3 of the migration originating server 20. The image of the physical memory of the server OS 4 of the migration originating server 20 is copied to the migrating destination server 21. Even when the memory failure and the memory addition occur in the migrating destination server 21, the administration manager 2 is thereby enabled to perform the active migration of the server OS 4 to the physical server from the virtual server in the state of matching with the configuration of the migrating destination server.

The administration manager 2 sets the connection information as instanced by updating the IP address of the server OS 4 booted in the migrating destination server 21 and transmitting the GARP. The active migration including the setting of the network is thereby enabled.

Second Embodiment

A second embodiment will discuss the active migration to the virtual server from the physical server. The information processing apparatus dynamically allocates the physical memory area for loading the Booting OS in the physical server as the migration originating server. The information processing apparatus boots the server OS by running the Booting OS in the physical server as the migration originating server. The information processing apparatus migrates the server OS to the virtual server as the migrating destination server.

<System Architecture>

Figure 14:
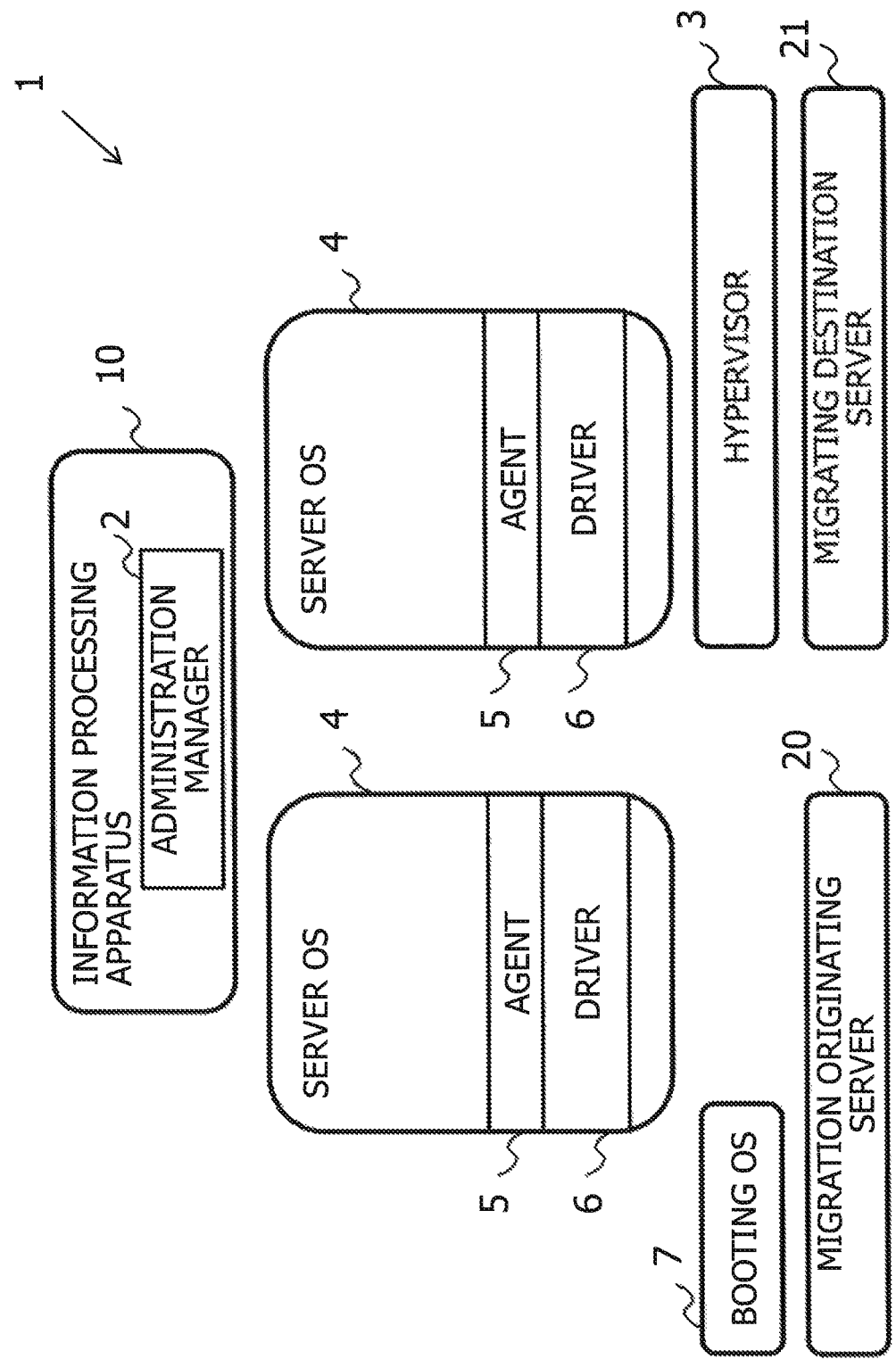
FIG. 14 is a diagram illustrating an operational example of a system architecture of the information processing system according to a second embodiment.

FIG. 14 is a diagram illustrating one example of a system architecture of the information processing system 1 according to the second embodiment. The system architecture according to the second embodiment is the same as in the first embodiment except a point that the migration originating server 20 is the physical server and the migrating destination server 21 is the virtual server, in which the components thereof are marked with the same numerals and symbols, and their explanations are therefore omitted. Note that the migration originating server 20 is the physical server and therefore includes the Booting OS 7 in place of the hypervisor 3. The migrating destination server 21 is the virtual server and therefore includes the hypervisor 3 in place of the Booting OS 7.

<Hardware Configuration>

A hardware configuration of the information processing apparatus 10 according to the second embodiment is the same as in the first embodiment, and hence its explanation is omitted.

Processing Example of Second Embodiment

The administration manager 2 performs the active migration to the migrating destination server 21 as the virtual server from the migration originating server 20 as the physical server by (2-1) allocating the physical memory area at the migration originating server, (2-2) running the Booting OS at the migration originating server, (2-3) virtualizing the server OS at the migration originating server, and (2-4) migrating the server OS and booting the server OS at the migrating destination server.

It is desirable for re-running the running server OS 4 as the guest OS in the migration originating server that the Booting OS 7 is loaded into the same pseudo physical address as the address of the physical memory area in the migration originating server. The administration manager 2 allocates the physical memory area in the migration originating server 20 via the agent 5 and the driver 6, and notifies the address of the allocated physical memory area to the Booting OS 7 of the guest OS. In the migration originating server 20, the Booting OS 7 runs at the same pseudo physical address as the address of the allocated physical memory area. The image of the pseudo physical memory of the re-run server OS 4 as the guest OS is migrated to the migrating destination server 21 as the virtual server. Owing to the migration of the memory image, in the migrating destination server 21 also, the Booting OS 7 runs at the same address as the address of the pseudo physical memory of the migration originating server 20. The Booting OS 7 runs at the same address as the address of the pseudo physical memory of the migration originating server 20, thereby enabling the active migration of the server OS 4 running on the migration originating server 20 to the migrating destination server 21 while retaining the running state.

(2-1) Allocating of Physical Memory Area at Migration Originating Server

Figure 15:
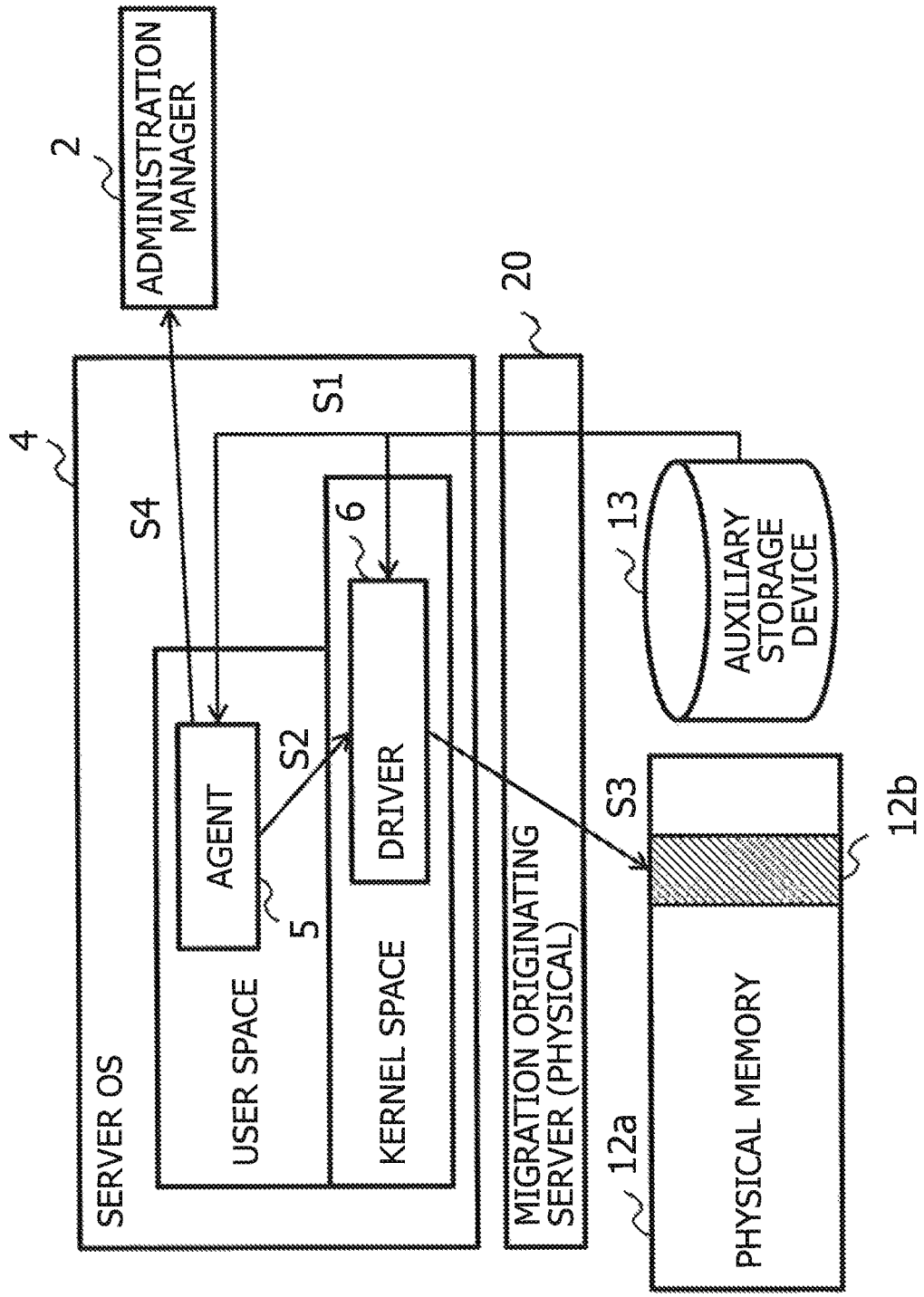
FIG. 15 is a diagram illustrating an operational example of allocating the physical memory area according to the second embodiment.

FIG. 15 is a diagram illustrating an operational example of allocating the physical memory area according to the second embodiment. The components are the same as those for enduring the physical memory area in the server OS 4 according to the first embodiment in FIG. 5 except a point that the server OS 4 runs not on the hypervisor 3 but on the migration originating server 20 as the physical server, and are marked with the same numerals and symbols, and hence their explanations are omitted.

(2-2) Running of Booting OS at Migration Originating Server

Figure 16:
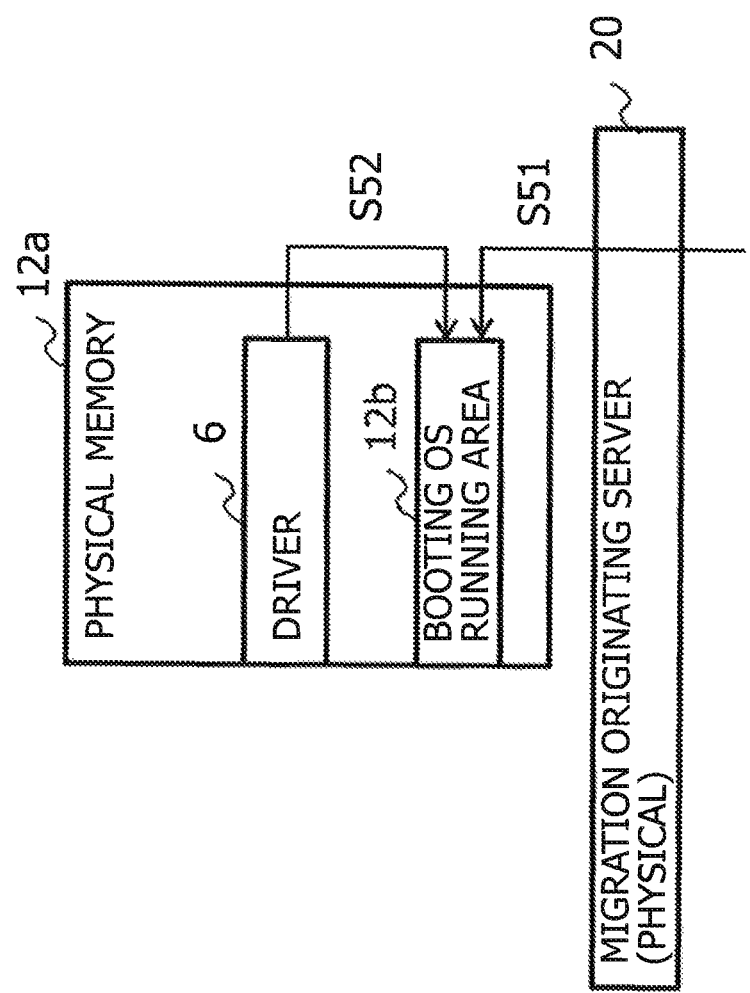
FIG. 16 is a diagram illustrating an operational example of running the Booting OS at the migration originating server.

FIG. 16 is a diagram illustrating an operational example of running the Booting OS 7 at the migration originating server 20. In FIG. 16, the migration originating server 20 is the physical server. The administration manager 2 instructs the agent 5 to execute processes of the operational example illustrated in FIG. 16.

When virtualizing the server OS 4, the administration manager 2 runs the Booting OS 7 at the same pseudo physical address as the address of the physical memory area allocated in "(2-1) Allocating of Physical Memory Area at Migration Originating Server", thereby enabling the server OS 4 to re-run as the guest OS.

The administration manager 2 loads the Booting OS 7 into the Booting OS running area 12b (S51). The administration manager 2 switches over the control in the migration originating server 20 to the Booting OS 7 from the driver 6, i.e., the running server OS 4, whereby the Booting OS 7 runs (S52).

(2-3) Virtualization of Server OS at Migration Originating Server

Figure 17:
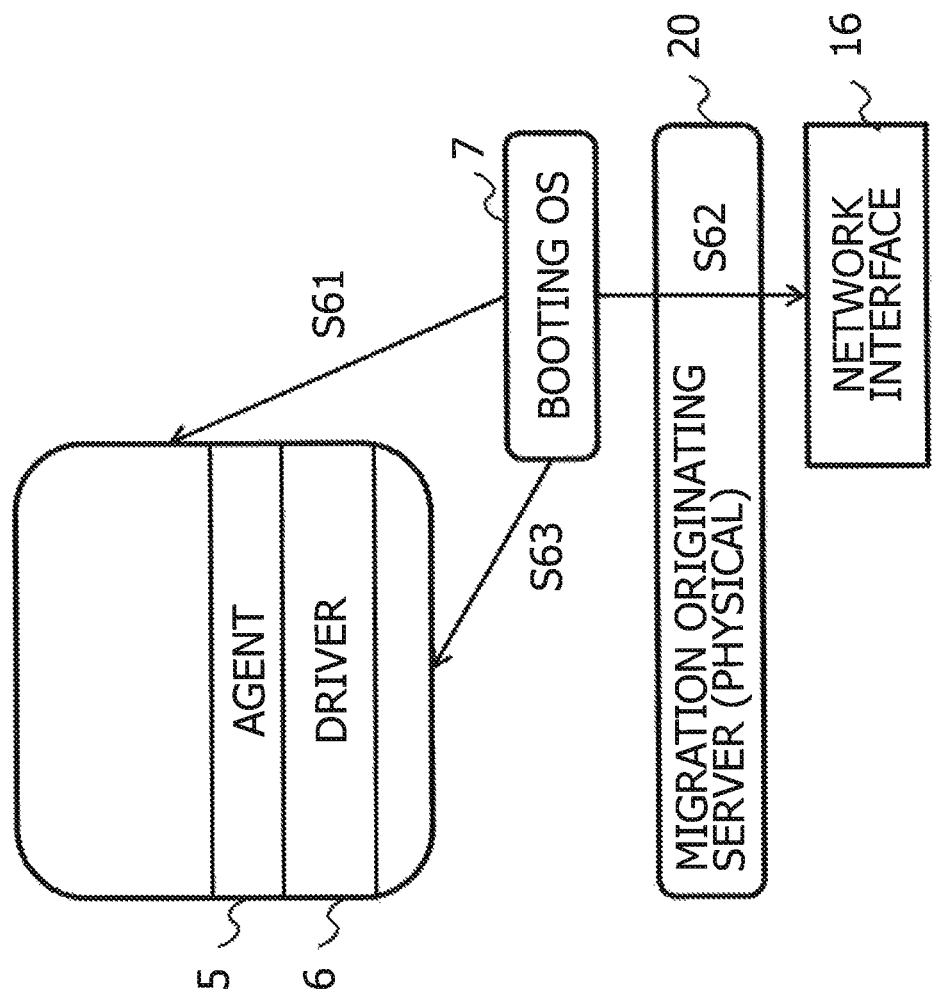
FIG. 17 is a diagram illustrating an operational example of booting the server OS at the migration originating server.

FIG. 17 is a diagram illustrating an operational example of running the server OS at the migration originating server 20. To start with, the Booting OS 7 acquires the CPU control information of the server OS 4, and sets the CPU control information of the guest OS in a storage area (S61). For example, the Booting OS 7 acquires values of the register group from the memory area of the server OS 4, and may simply set the acquired values in the memory area of the Booting OS 7, e.g., with a VMCS data structure.

Next, the Booting OS 7 allocates the network interface of the server OS 4 by use of, e.g., an SR-IOV (Single Root I/O Virtualization) technology (S62). The SR-IOV is one of the hardware-based virtualization technologies, and implements a device sharing process on the hardware side. In one physical NIC (Network Interface Card) device, a plurality of virtual NIC devices is generated and connected to intra-NIC network switches implemented in the hardware, whereby the NIC devices can be shared. The Booting OS 7 runs the server OS 4 as the guest OS of the VT-x as one of the hardware-based virtualization technologies (S63).

Figure 18:
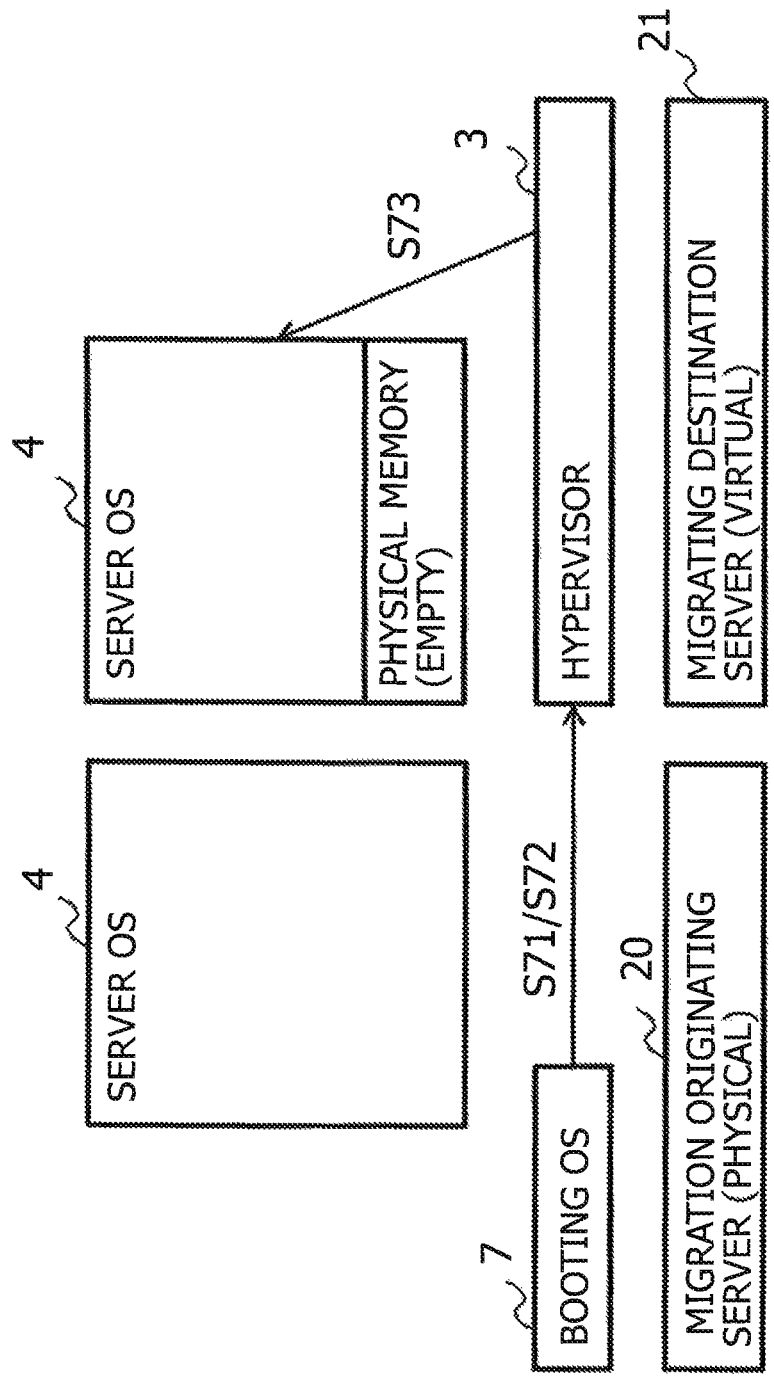
FIG. 18 is a diagram illustrating an operational example of a migration of the server OS to the virtual server from the physical server.

(2-4) Migration of Server OS and Running of Server OS at Migrating Destination Server FIG. 18 is a diagram illustrating an operational example of the migration of the server OS 4 to the virtual server from the physical server. The Booting OS 7, upon the instruction of the administration manager 2, starts migrating the image of the pseudo physical memory of the server OS 4 to the hypervisor 3 (S71). Note that the pseudo physical address on the hypervisor 3 is assumed to be the same as the physical address on the migration originating server 20.

The Booting OS 7 determines a converging condition as to whether a residual quantity of the memory migration is equal to or smaller than a predetermined quantity, and suspends the server OS 4 when satisfying the condition. The Booting OS 7 migrates the remaining physical memory image of the server OS 4 and the CPU control information to the hypervisor 3 (S72). The hypervisor 3 sets the migrated CPU control information in the memory area of the server OS 4, and runs the server OS 4 (S73).

Operational Effect of Second Embodiment

According to the second embodiment, the administration manager 2 allocates the agent 5 and the driver 6 onto the server OS 4, and allocates the physical memory area for loading the Booting OS 7 in the migration originating server 20. The administration manager 2 runs the Booting OS 7 at the address of the allocated physical memory area in the migration originating server 20 as the physical server. The Booting OS 7 runs the server OS 4 as the guest OS in the migration originating server 20. The Booting OS 7 migrates the server OS 4 to the migrating destination server 21. The hypervisor 3 of the migrating destination server 21 boots the migrated server OS 4. The virtualization of the server OS 4 on the physical server can be thereby attained. In the migration originating server 20 as the physical server, the Booting OS 7 runs at the address of the allocated physical memory area, and the server OS 4 is virtualized, thereby enabling the active migration to the virtual server from the physical server and facilitating the operation management of the server.

The Booting OS 7 acquires the CPU control information of the migration originating server 20, and transfers the acquired control information to the hypervisor 3 of the migrating destination server 21. The hypervisor 3 of the migrating destination server 21 boots the server OS 4, based on the transferred CPU control information. The active migration encompassing the CPU control information can be thereby attained.

Third Embodiment

A third embodiment will discuss the active migration to the physical server from the physical server. The third embodiment is attained by combining the processes according to the first and second embodiments.

<System Architecture>

FIG. 19 is a diagram illustrating one example of a system architecture of the information processing system 1 according to the third embodiment. Except a point that both of the migration originating server 20 and the migrating destination server 21 are the physical servers, the components are the same as those in the first embodiment and are marked with the same numerals and symbols, and hence their explanations are omitted. Note that the migration originating server 20 is the physical server and therefore includes a migration originating Booting OS 7a in place of the hypervisor 3. The migrating destination server 21 includes a migrating destination Booting OS 7b.

<Hardware Configuration>

A hardware configuration of the information processing apparatus 10 according to the third embodiment is the same as in the first embodiment, and hence its explanation is omitted.

Processing Example of Third Embodiment

The administration manager 2 performs the active migration to the migrating destination server 21 as the physical server from the migration originating server 20 as the physical server in the following processes of the processes according to the first and second embodiments:

(2-1) Allocating of the physical memory area at the migration originating server;
(2-2) Running of the Booting OS at the migration originating server;
(2-3) Virtualization of the server OS at the migration originating server;
(1-2) Running of the Booting OS at the migrating destination server;
(1-3) Reconfiguration of the memory area; and
(1-4) Boot of the server OS at the migrating destination server.

FIG. 20 is a flowchart illustrating one example of the migration process between the physical servers according to the third embodiment. A first half of the migration process between the physical servers is the same as the first half of the process, i.e., the migration process to the virtual server from the physical server according to the second embodiment. A second half of the migration process between the physical servers is the same as the second half of the process, i.e., the migration process to the physical server from the virtual server according to the first embodiment. A start of the migration process between the physical servers is triggered by, e.g., an instruction of the administration manager 2.

In OP41, the administration manager 2 allocates the physical memory area in the migration originating server 20. To be specific, the administration manager 2 causes the driver to allocate the physical memory area on the server OS 4 of the migration originating server 20 via the agent 5. The administration manager 2 acquires the address of the allocated physical memory area from the driver 6 via the agent 5. Next, the processing advances to OP42.

In OP42, the administration manager 2 runs the migration originating Booting OS 7a at the migration originating server 20. Specifically, the administration manager 2 runs the migration originating Booting OS 7a at the address of the allocated physical memory area. Subsequently, the processing advances to OP43.

In OP43, the administration manager 2 virtualizes the server OS 4 at the migration originating server 20. To be specific, the migration originating Booting OS 7a boots the server OS 4 as the guest OS upon the instruction of the administration manager 2. Next, the processing advances to OP44.

In OP44, the administration manager 2 runs the migrating destination Booting OS 7b at the migrating destination server 21. Specifically, the migrating destination Booting OS 7b, upon the instruction of the administration manager 2, runs at the migrating destination server 21, and migrates to the same address as the address of the physical memory area allocated in OP42. The control shifts to the migrating destination address, and the migrating destination Booting OS 7b runs at the address of the migrating destination. Next, the processing advances to OP45.

In OP45, the administration manager 2 reconfigures the memory area. Specifically, the administration manager 2 changes the configuration of the pseudo physical memory allocated to the server OS 4 virtualized on the migration originating Booting OS 7a of the migration originating server 20 to become the same as the configuration of the physical memory of the migrating destination server 21. Next, the processing advances to OP46.

In Op46, the administration manager 2 boots the server OS 4 at the migrating destination server 21. FIG. 21 illustrates an operational example of the process in OP46. FIG. 21 is a diagram illustrating an operational example of booting the server OS at the migrating destination server according to the third embodiment.

The migrating destination Booting OS 7b, upon the instruction of the administration manager 2, accepts the communication from the migration originating Booting OS 7a (S81). The migration originating Booting OS 7a transfers a pseudo physical page of the server OS 4 of the migration originating server to the migrating destination server 21 (S82). Note that the physical memory area allocated for the migration originating Booting OS 7a is empty and is not therefore transferred.

The migrating destination Booting OS 7b accepts the data transferred from the migration originating Booting OS 7a and writes the accepted data to the physical memory (S83). The migration originating Booting OS 7a migrates the server OS 4 of the migration originating server to the ACPI S3 (halt) state (S84).

The migration originating Booting OS 7a transfers the CPU control information of the server OS 4 of the migration originating server to the migrating destination server 21 (S85). The migrating destination Booting OS 7b migrates the server OS 4 of the migrating destination server to the ACPI S3 state (S86).

The administration manager 2 transmits the Wake On Lan packet to the server OS 4 of the migrating destination server via the network, and sets the server OS 4 of the migrating destination server in the boot state (S87). "Wake On Lan" is the technology of remotely switching ON the power source of the computer connected to the network, and enables self power-ON by transmitting the Wake On Lan packet to the computer.

The server OS 4 of the migrating destination server may be booted by setting the wake-up timer as the function of the ACPI 30 before the switchover to the server OS 4 of the migrating destination server from the migrating destination Booting OS 7b.

The agent 5 on the server OS 4 of the migrating destination server issues the network reset notification (S88). To be specific, the agent 5 updates the IP address of the server OS 4, and broadcasts the GARP and other equivalent protocols. The GARP is transmitted for checking whether the IP address is overlapped within the same network and for updating the ARP cache on the network device on the same segment. The GARP may also be transmitted by the migrating destination Booting OS 7b.

Operational Effect of Third Embodiment

The processes according to the first and second embodiments are combined, thereby enabling the active migration of the server OS 4 between the physical servers and facilitating the operation management of the server.

The configurations according to the embodiments discussed above and configurations of modified examples may be combined to the greatest possible degree and thus carried out.

The information processing system, the information processing program and the information processing apparatus of the disclosure enable the migration between the virtual server and the physical server or between the physical servers during the operation of the server.

<Non-Transitory Recording Medium>

A program making a computer, other machines and apparatuses (which will hereinafter be referred to as the computer and other equivalent apparatuses) attain any one of the functions, can be recorded on a non-transitory recording medium readable by the computer and other equivalent apparatuses. The computer and other equivalent apparatuses are made to read and run the program on this non-transitory recording medium, whereby the function thereof can be provided.

Herein, the non-transitory recording medium readable by the computer and other equivalent apparatuses connotes a non-transitory recording medium capable of accumulating information instanced by data, programs and other equivalent information electrically, magnetically, optically, mechanically or by chemical action, which can be read from the computer and other equivalent apparatuses. Among these non-transitory recording mediums, the mediums removable from the computer and other equivalent apparatuses are exemplified by a flexible disc, a magneto-optic disc, a CD-ROM, a CD-R/W, a DVD, a Blu-ray disc, a DAT, an 8 mm tape, and a memory card like a flash memory. A hard disc, a ROM and other equivalent recording mediums are given as the non-transitory recording mediums fixed within the computer and other equivalent apparatuses. Further, a solid state drive (SSD) is also available as the non-transitory recording medium removable from the computer and other equivalent apparatuses and also as the non-transitory recording medium fixed within the computer and other equivalent apparatuses.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing system comprising:
   a first server;

a second server; and an information processing apparatus, the information processing apparatus including:
- a processor configured to manage a process of causing OS (Operating System) running on the first server to run on the second server, and the first server including:
  - a driver configured to acquire an address of a first physical memory area allocated for running Booting OS to boot the OS on the first server during an operating status of the first server; and
  - a controller configured to notify the processor of the address of the first physical memory area, the first server is a physical server, the processor causes the Booting OS to run at a pseudo physical address corresponding to the address of the first physical memory area of the first server, the processor causes the Booting OS to acquire control information of the processor from the OS running on the first server and to re-run the OS as a virtualized quest OS on the first server based on the control information, the processor equalizes an address of a second physical memory area allocated for running the Booting OS on the second server to the address of the first physical memory area, and the processor causes the OS to run on the second server by transferring the OS to the second server from the first server.

2. The information processing system according to claim 1, wherein the processor notifies, when the second server is a physical server, the second server of the address of the first physical memory area, and runs the Booting OS at the address of the second physical memory area on the second server.

3. The information processing system according to claim 2, wherein the processor notifies the first server of configuration information of a third physical memory area of the second server, and the first server changes a configuration of a fourth physical memory area of the first server, corresponding to the configuration information, under control of the OS running on the first server.

4. The information processing system according to claim 2, wherein the processor changes connection information to the OS transferred to the second server from the first server.

5. A non-transitory computer-readable recording medium having stored therein a program for causing a computer to execute a process comprising:
- acquiring an address of a first physical memory area allocated for running Booting OS to boot the OS running on a first server during an operating status of the first server;

the first server is a physical server, and the process is further comprises:
- causing the Booting OS to run at a pseudo physical address corresponding to the address of the first physical memory area of the first server;
- causing the Booting OS to acquire control information of the processor from the OS running on the first server and to re-runs the OS as a virtualized guest OS on the first server, based on the control information;
- equalizing an address of a second physical memory area allocated for running the Booting OS on a second server to the address of the first physical memory area;
- transferring the OS to the second server from the first server; and
- causing the OS to run on the second server.

6. The non-transitory computer-readable recording medium according to claim 5, wherein the process further comprises: notifying, when the second server is a physical server, the second server of the address of the first physical memory area; and causing the Booting OS to run at the address of the second physical memory area on the second server.

7. The non-transitory computer-readable recording medium according to claim 5, wherein the process further comprises: causing, when the first server is the physical server, the Booting OS to run at the address of the first physical memory area of the first server; and booting the OS on the Booting OS, the OS running on the first server.

8. An information processing apparatus for managing a process of causing OS running on a first server to run on a second server, the information processing apparatus comprising:
- a processor configured to install, to the first server, a driver configured to acquire an address of a first physical memory area allocated for running Booting OS to boot the OS on the first server during an operating status of the first server, and a controller configured to notify the processor of the address of the first physical memory area, the first server is a physical server, and the processor is further configured:
- to cause the Booting OS to run at a pseudo physical address corresponding to the address of the first physical memory area of the first server;
- to cause the Booting OS to acquire control information of the processor from the OS running on the first server and to re-runs the OS as a virtualized quest OS on the first server, based on the control information;
- to equalize an address of a second physical memory area allocated for running the Booting OS on the second server to the address of the first physical memory area; and
- to cause the OS to run on the second server by transferring the OS to the second server from the first server.

* * * * *